(12) United States Patent
Dasher et al.

(10) Patent No.: US 12,505,440 B2
(45) Date of Patent: Dec. 23, 2025

(54) DISPLAYING REPRESENTATIONS OF A VIRTUAL CARD WITHIN A VIRTUAL WALLET APPLICATION TO ENHANCE AUTHENTICATION SECURITY AND TO PROVIDE ANTI-PHISHING METHODS

(71) Applicant: Adeia Guides Inc., San Jose, CA (US)

(72) Inventors: Charles Dasher, Lawrenceville, GA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 69 days.

(21) Appl. No.: 18/141,213

(22) Filed: Apr. 28, 2023

(65) Prior Publication Data
US 2024/0362629 A1 Oct. 31, 2024

(51) Int. Cl.
G06Q 20/40 (2012.01)
G06Q 20/36 (2012.01)
G06T 13/00 (2011.01)
G08B 3/10 (2006.01)
H04L 9/40 (2022.01)

(52) U.S. Cl.
CPC ....... *G06Q 20/401* (2013.01); *G06Q 20/3674* (2013.01); *G06T 13/00* (2013.01); *G08B 3/10* (2013.01); *H04L 63/1483* (2013.01)

(58) Field of Classification Search
None
See application file for complete search history.

(56) References Cited

U.S. PATENT DOCUMENTS

| 9,451,315 | B2 | 9/2016 | Pearlman et al. | |
|---|---|---|---|---|
| 2014/0334721 | A1* | 11/2014 | Cervin | G06V 30/416 |
| | | | | 382/160 |
| 2016/0253651 | A1* | 9/2016 | Park | G06Q 20/34 |
| | | | | 705/39 |
| 2016/0253669 | A1* | 9/2016 | Yoon | G06Q 20/327 |
| | | | | 705/75 |
| 2019/0295054 | A1* | 9/2019 | Purves | G06Q 30/0226 |

(Continued)

FOREIGN PATENT DOCUMENTS

| CN | 112231666 A | * | 1/2021 | ............. G06F 21/31 |
|---|---|---|---|---|

OTHER PUBLICATIONS

Quadry, K. M., et al., "Design, Analysis, and Implementation of a Two-factor Authentication Scheme using Graphical Password", I. J .Computer Network and Information Security, 2021, 3, 39-51. (Year: 2021).*

*Primary Examiner* — Clay C Lee

(74) *Attorney, Agent, or Firm* — HALEY GUILIANO LLP

(57) ABSTRACT

Systems and methods are described herein for updating a representation of a virtual payment card in response to a virtual transaction between a first device (e.g., a user device) and a second device (e.g., a merchant point-of-sale device). The systems and methods may be used to authenticate user identity with an additional layer of security and/or combat phishing attempts intended to dupe users into disclosing confidential profile information. In response to a completed transaction, the second device delivers interactivity data (e.g., animation data, card image data, contextual data, notification sound data, etc.) to the first device, which actuates a distinct representation (e.g., an animation, a graphic image, a notification sound, etc.) of the card image of the virtual payment card used in the completed transaction.

18 Claims, 18 Drawing Sheets

(56) References Cited

U.S. PATENT DOCUMENTS

| | | |
|---|---|---|
| 2021/0358261 A1 | 11/2021 | Hughes et al. |
| 2022/0391867 A1* | 12/2022 | Glaser .................... G06F 3/016 |
| 2025/0106480 A1 | 3/2025 | Pearlman et al. |

* cited by examiner

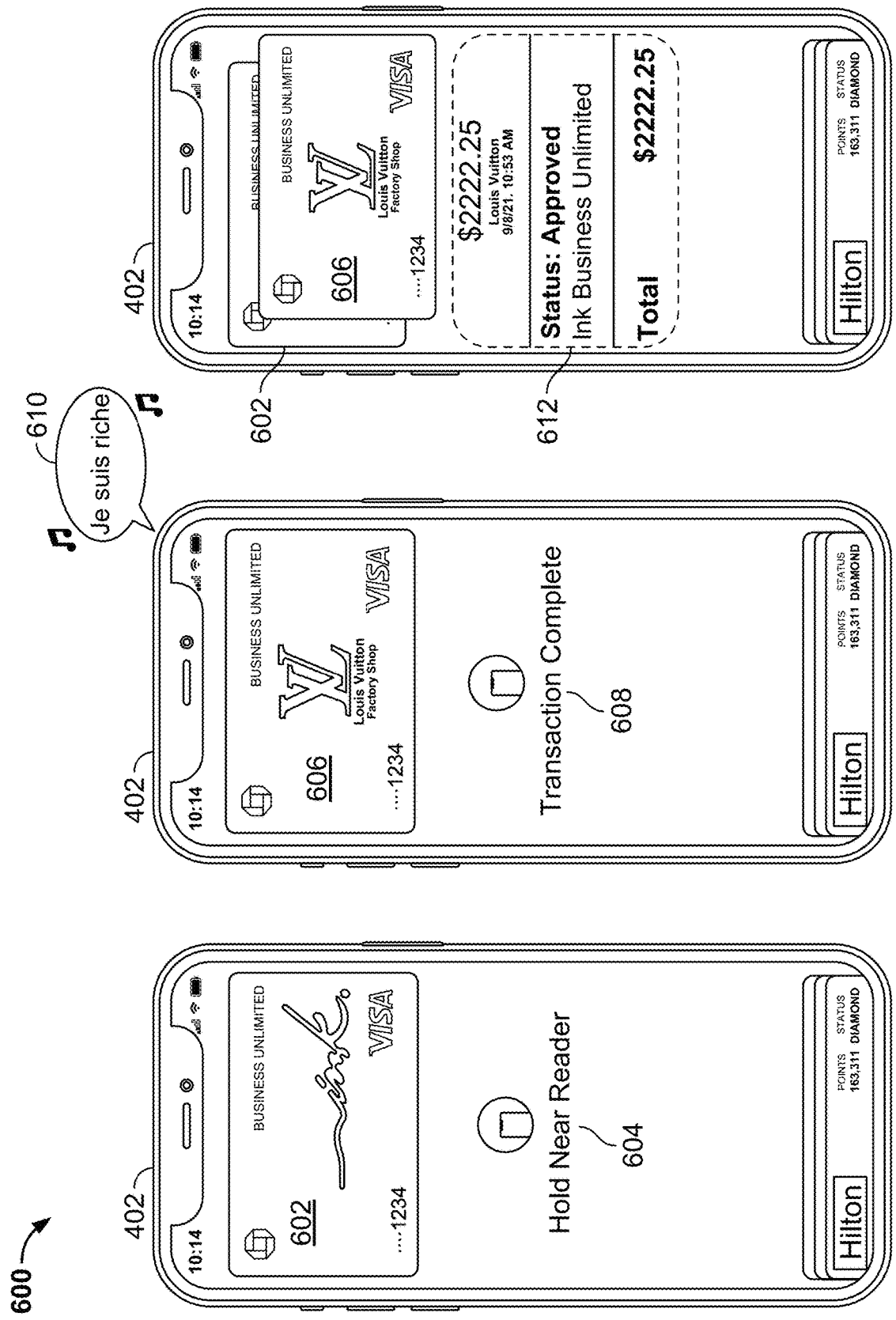

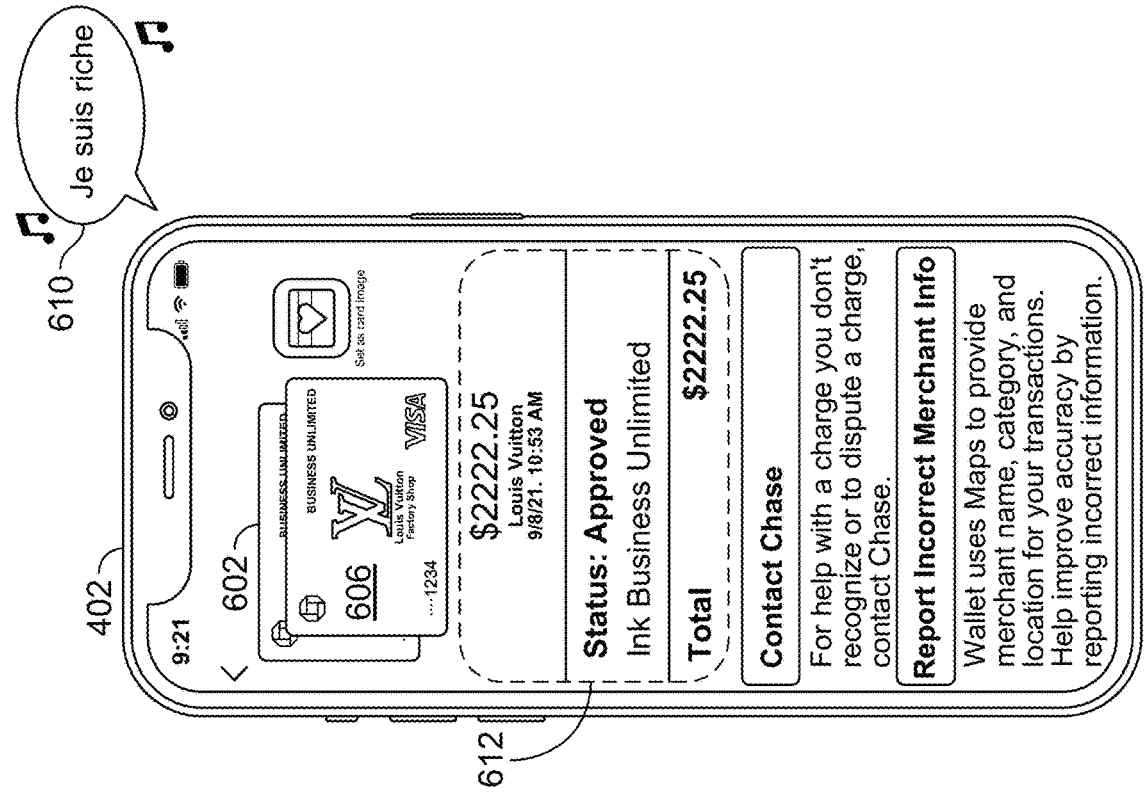
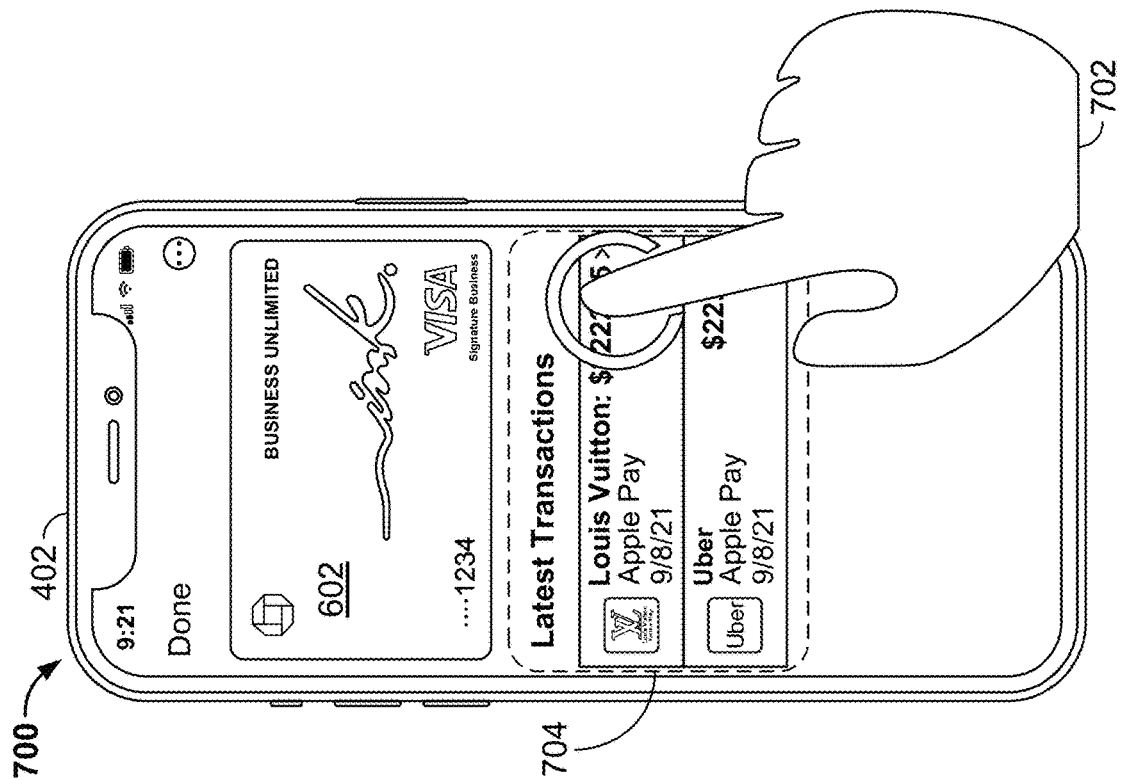
FIG. 7B
FIG. 7A

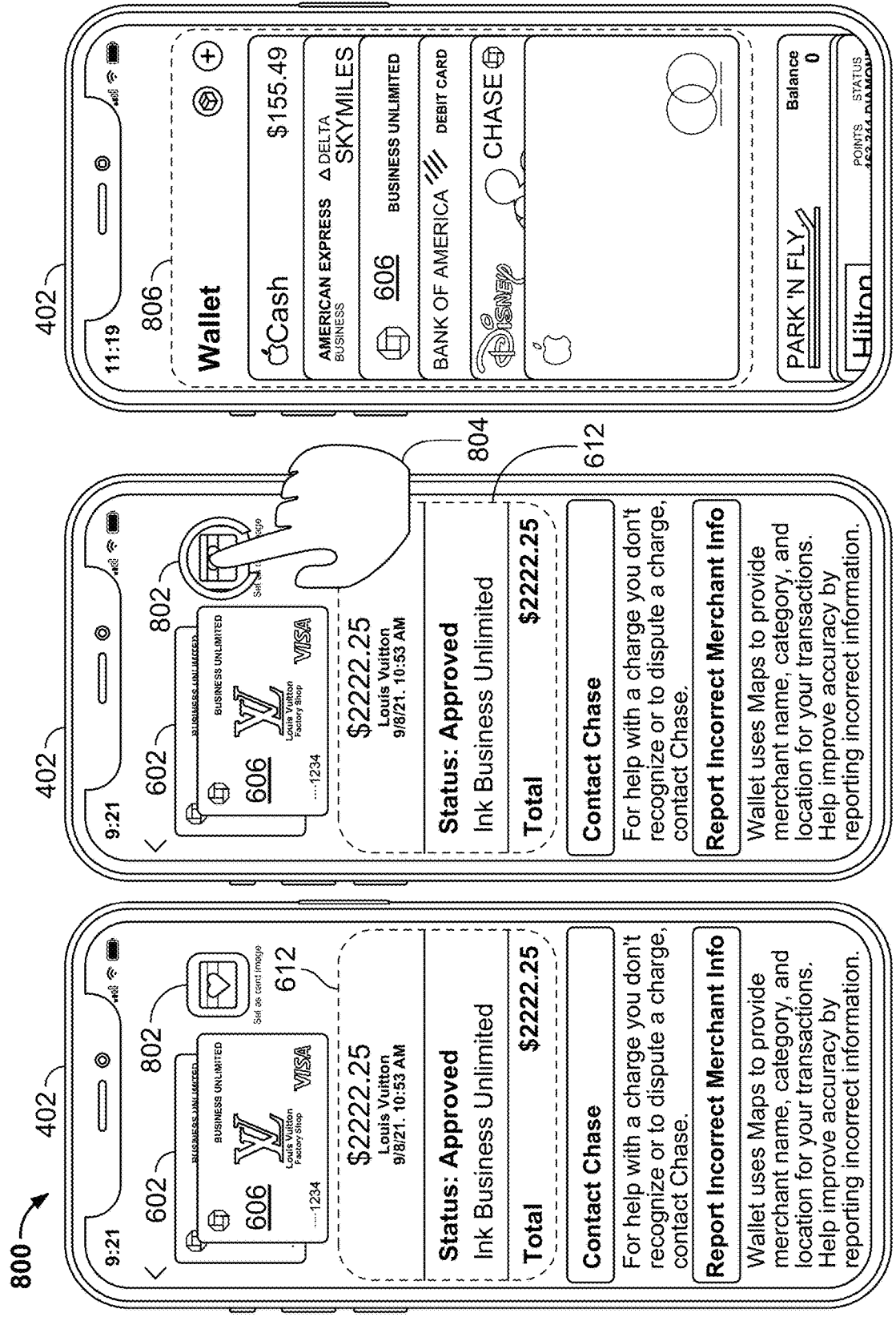

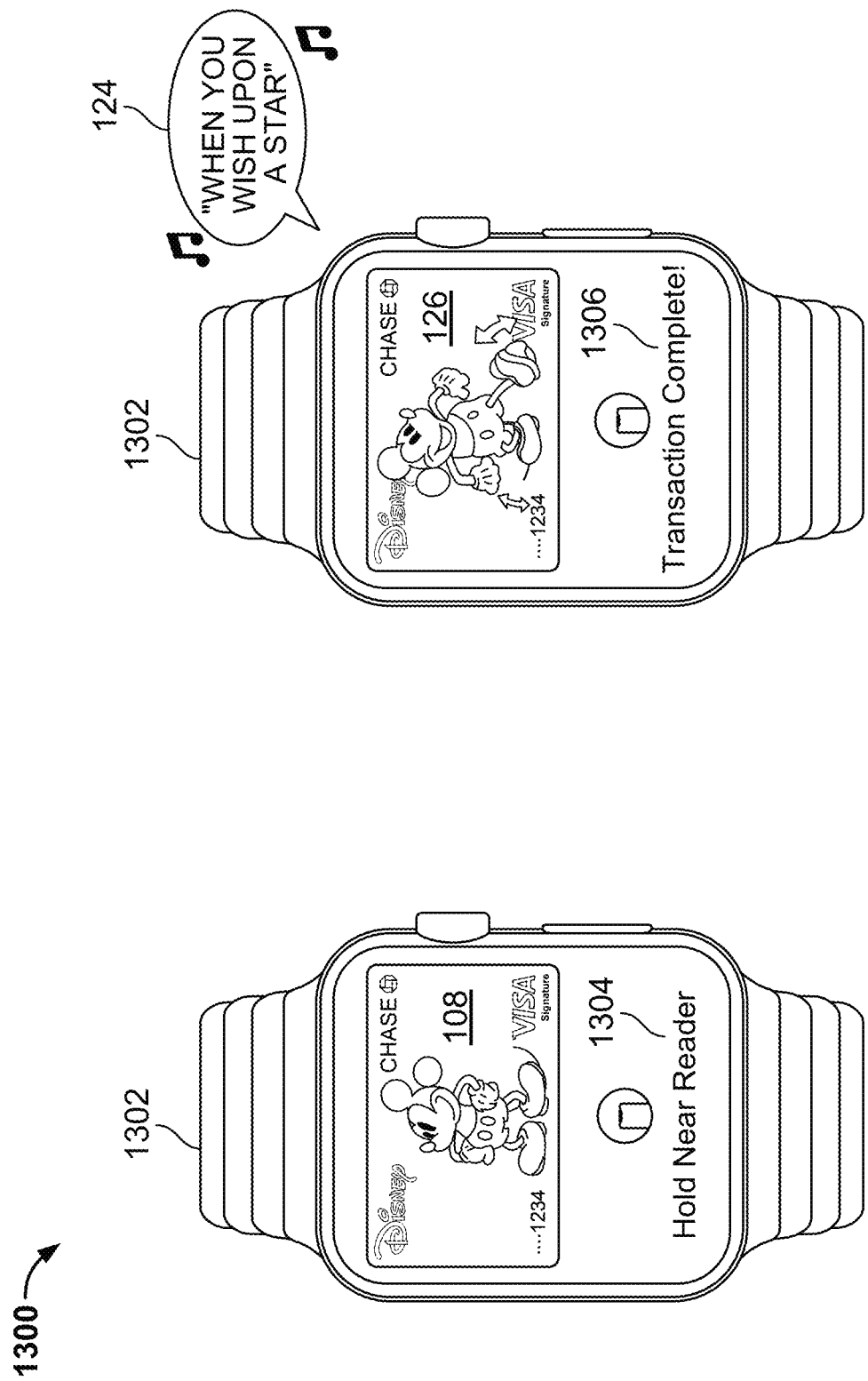

DISPLAYING REPRESENTATIONS OF A VIRTUAL CARD WITHIN A VIRTUAL WALLET APPLICATION TO ENHANCE AUTHENTICATION SECURITY AND TO PROVIDE ANTI-PHISHING METHODS

BACKGROUND

This disclosure relates, at least in part, to systems and methods for using animations in a virtual wallet application and for enhancing security using such animations.

SUMMARY

This disclosure is directed, in part, to systems and methods for distinguishing transactions using a payment card within a virtual wallet application, each transaction including a respective animation, graphic image change, and/or notification sound using data received from another device. In particular, techniques are disclosed for using various representations (e.g., animations, graphic image changes, and/or notification sounds) of a payment card to enhance security by using previous transaction animation as a second factor authentication challenge and to prevent phishing attacks meant to dupe users into disclosing profile credentials related to the payment card using previous transaction animation as a visual signature.

Technological advancements in near field communication (NFC) have enabled customers to pay for goods and/or services with tap to pay methods, which enable users to complete contactless transactions with vendors by creating a wireless personal area network (PAN). Two or more devices may use this short-range communication protocol and data exchange format to perform secure transactions. An initiator and target device that are compatible with each other are typically within a short range (e.g., 4 centimeters) to complete a transaction and/or data transfer, which may occur in either an active or passive communication mode. Active communication mode occurs when both the initiator and target devices can individually generate a field through which to communicate, whereas passive communication mode occurs when the initiator device supplies a carrier field, and the target device is responsible for modulating the field to receive a data transfer. NFC technology, in addition to contactless payment with smart devices, may be utilized in ticketing (e.g., for concerts, sporting events, public transportation, air travel, etc.), voting, healthcare/fitness, advertising, and/or home automation (e.g., internet of things (IoT)).

In one approach when an NFC transaction occurs, a generic animation is played (e.g., a check mark appears over a representation of a payment card). Generic transaction confirmations such as check marks fail to provide security (e.g., two-step authentication, anti-phishing activity, etc.) for virtual payment cards, which invites fraud and/or other unauthorized activity. For example, a device with a virtual payment card may request an input of log-in credentials within a virtual wallet application to, e.g., present new terms and/or policies of a banking institution associated with the virtual payment card, to display an account's monthly statement associated with the virtual payment card, etc. In addition to log-in credentials, the device may require two-step verification, which adds a second level of security to prevent infiltration of an account associated with the virtual payment card. For static payment cards, two-step verification occurs in the form of the device asking personal questions only the account owner could answer (e.g., the city where the account owner's parents met, the first name of the account owner's childhood friend, the street name the account owner grew up on, etc.). Accordingly, if the account owner's log-in credentials are ever disclosed an infiltrator would not be able to get past the second level of security provided by two-step verification. A generic transaction animation is not useful in two-step verification because it offers the same animation for every transaction, so there is no way to distinguish previous transactions. For example, a two-step verification page generated for display by a device may request a selection of the most recent transaction animation or graphic image change related to the virtual payment card and present four options (three of which are incorrect), but a generic transaction animation would be futile in this scenario because the same check mark would be used for each option.

In another example, a generic check mark animation can't be used to prevent phishing activity meant to trick users into disclosing log-in credentials. Phishing is an attempt to send illegitimate emails, messages, notifications, links, pages, etc. to users, posing as the users' banking institution or some other legitimate service provider, to convince the users to disclose log-in information and expose themselves to theft and/or fraud. For example, a phishing scheme may include an email sent to a user, posing as the user's credit card vendor, requesting the user to log-in due to suspicious card activity. By providing their account's log-in information for their credit card, the user will have exposed themself to possible credit card fraud. Generic transaction confirmations fail in preventing phishing activity because they provide no way to distinguish payment card transactions and, thus, a distinct, recognizable visual signature of the virtual payment card at a log-in page cannot be provided to ensure user protection. These shortcomings in virtual payment card security expose users to unnecessary risk that could be avoided if there existed a method and/or system to distinguish each transaction made with the virtual payment card via a visual signature.

To overcome these problems, methods and systems are provided herein that allow for a merchant point-of-sale device to deliver animation data, card image data, and/or notification sound data to a user device such that, upon completion of a transaction between the user device and the merchant point-of-sale device, a virtual payment card within a virtual wallet application of the user device plays an animation, in accordance with received animation data, or changes a card image of the virtual payment card, in accordance with received card image data, to provide a distinct representation of the virtual payment card that corresponds with each individual transaction. Each distinct representation of the virtual payment card enables the methods and/or systems disclosed herein to enhance the virtual payment card's security via two-step authentication and/or anti-phishing processes.

Implementing any one or more of the techniques described herein, a method comprises generating for display on a first device a first representation of a payment card, detecting a transaction using the payment card, receiving, via a network, interactivity data from a second device, wherein the interactivity data is transmitted by the second device in response to the transaction using the payment card, and generating for display a second representation of the payment card modified according to the interactivity data.

In some embodiments, the method may further comprise authenticating a user of the payment card by generating for simultaneous display the second representation of the payment card and a plurality of alternative representations of the payment card that were not generated for display during previous transactions using the payment card, receiving a selection of one of the second representation of the payment card or one of the plurality of alternative representations of the payment card, and authenticating the user of the payment card only in response to the selection of the second representation of the payment card. For example, the first device may generate for display an animation of Mickey Mouse dancing, a card image with a Nike design, and an animation of Donald Duck dancing and request a selection of the last animation/graphic image depicted on the payment card within the virtual wallet application to actuate two-step authentication, provide an additional layer of security for the account associated with the virtual payment card, and prevent theft and/or fraud. In some embodiments, two-step authentication, as described herein, may require more than two layers of security and thus be referred to as multi-step authentication.

In some embodiments, the method may further comprise preventing phishing attacks by the first device generating for display an authentication page that requests an input of credentials and simultaneously generating for display the second representation of the payment card modified according to the interactivity data. For example, the first device may generate for display an animation of Minnie Mouse dancing (e.g., the most recent second representation depicted on the payment card within the virtual wallet application) when requesting log-in credentials related to the payment card to ensure the page displayed by the first device is related to a legitimate banking institution.

In some embodiments, the second device may be a merchant point-of-sale device, and the detection of the transaction may comprise detecting a payment at the merchant point-of-sale device using the payment card. In some embodiments, the first device receiving the interactivity data from the second device may comprise receiving animation data from the merchant point-of-sale device, and the first device generating for display the second representation of the payment card modified according to the interactivity data may comprise changing a generic image of the first representation of the payment card with an animation using the received animation data. In some embodiments, the first device receiving the interactivity data from the second device may further comprise receiving notification sound data from the merchant point-of-sale device, and the method may further comprise playing an audio alert related to the animation using the received notification sound data simultaneously with the second representation of the payment card.

In some embodiments, the first device receiving the interactivity data from the second device may comprise receiving card image data from the merchant point-of-sale device, and the first device generating for display the second representation of the payment card modified according to the interactivity data may comprise changing a first image of the first representation of the payment card with a second image using the received card image data. In some embodiments, the second image using the received card image data may be persisted in place of the first image of the first representation of the payment card for future transactions. In some embodiments, the method may further comprise generating for display a user interface comprising a list of past transactions that used the payment card, receiving a selection of a particular past transaction from the list of past transactions, and generating for display a representation of the payment card modified according to interactivity data that was provided during the particular past transaction. In some embodiments, the provided interactivity data may comprise notification sound data from a merchant point-of-sale device, and the method may further comprise playing an audio alert related to the representation of the payment card using the notification sound data simultaneously with the representation of the payment card modified according to the interactivity data that was provided during the particular past transaction.

In some embodiments, the method may further comprise the first device displaying transaction goals for the payment card, wherein each of the transaction goals includes criteria to access a representation of the payment card and, in response to the transaction using the payment card satisfying the criteria, granting access to the representation of the payment card. In some embodiments, the method may further comprise generating for display the second representation of the payment card based on contextual data received from the first device, wherein the contextual data comprises weather data, global positioning system (GPS) data, proximity data to a known device, or connected device data. In some embodiments, the first device may include a connected device (e.g., a smartwatch, tablet, etc.) such that a merchant point-of-sale device may complete a transaction and transfer data (e.g., animation data, card image data, notification sound data, etc.) with the connected device to generate for display an animation and/or graphic image change on a payment card within a virtual wallet application on the connected device. In some embodiments, the first device may generate for display an animation on a payment card within a virtual wallet application in response to successfully receiving and/or delivering money to someone else.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 6A-6C show an illustrative virtual wallet application where a graphic image replaces a card image of a payment card in response to a completed transaction and transaction details are generated for display, in accordance with some embodiments of the present disclosure;

FIGS. 7A-7B show an illustrative graphical user interface for replaying a representation of a previous transaction involving the virtual payment card, in accordance with some embodiments of the present disclosure;

FIGS. 8A-8C show an illustrative graphical user interface for persisting a graphic image as a card image of a payment card, in accordance with some embodiments of the present disclosure;

FIGS. 13A-13B show an illustrative virtual wallet application where a representation of a virtual payment card confirms a completed transaction within a connected user device, in accordance with some embodiments of the present disclosure;

DETAILED DESCRIPTION

Figure 1:
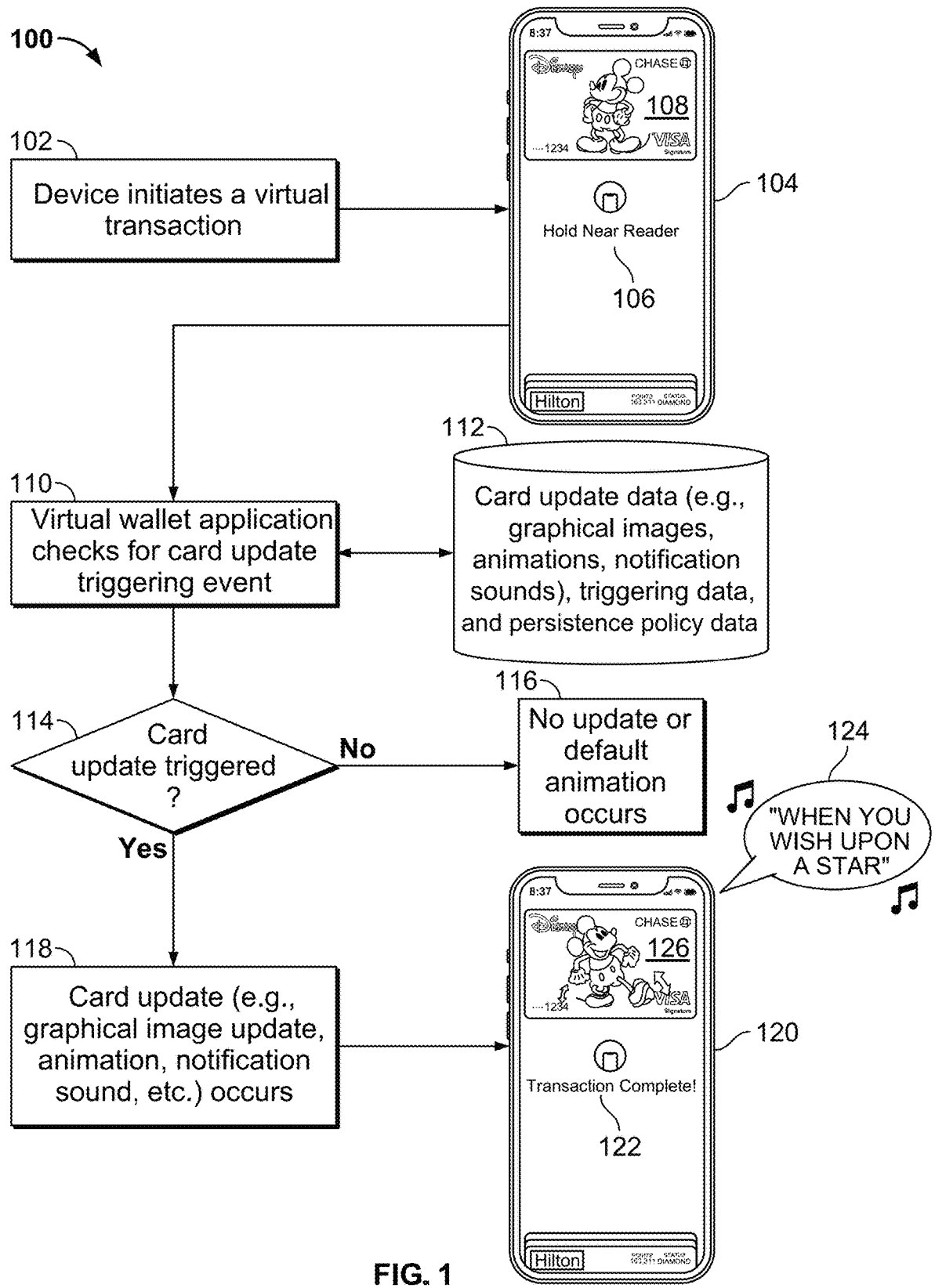
FIG. 1 shows an illustrative system for confirming a completed transaction using a virtual payment card with a representation of the virtual payment card, in accordance with some embodiments of the present disclosure.

FIG. 1 shows an illustrative system for confirming a completed transaction using a virtual payment card with a representation of the virtual payment card, in accordance with some embodiments of the present disclosure. System 100 may occur in the context of a communication network 309 (e.g., a wireless personal area network (PAN)) to complete a contactless transaction between a first device (e.g., user equipment 200) and a second device (e.g., a merchant point-of-sale device 201). At step 102, the first device initiates a virtual transaction with the second device once the first device is within a threshold distance (e.g., 4 centimeters) to the second device. In some embodiments, the first device may initiate a data transfer with the second device, where the data transfer includes concert tickets, movie tickets, travel passes (e.g., for an airplane, train, bus, etc.), sports tickets, voting passes, fitness/health notifications, household internet of things (IoT) updates, etc. At step 104, the first device generates for display, via display 212, a virtual wallet application with the virtual payment card depicting a first representation 108 (e.g., a generic image) of its card image before the transaction with the second device is completed. Although the first representation 108 shows Mickey Mouse statically standing with his hands at his hips, in some embodiments, the payment card may display other Disney characters (e.g., Minnie Mouse, Donald Duck, Goofy, Buzz Lightyear, etc.). In some embodiments, the payment card may be associated with another brand such that other characters, animations, and/or graphic images are presented as the generic card image. For example, the payment card may be associated with an airline (e.g., American Airlines, Southwest, JetBlue, etc.) and depict a plane animation and/or the airline's logo as its generic card image. In some embodiments, the payment card may be associated with a hotel brand (e.g., Hilton, Marriott, etc.) and depict a hotel graphic and/or the hotel's logo as its generic card image. In some embodiments, the payment card may be a generic credit card and display no characters, animations, and/or graphic images as its card image.

After the first device (e.g., user equipment 200), via the virtual wallet application, delivers instructions to hold the first device within a threshold distance of the second device 106, system 100 proceeds to step 110, where the virtual wallet application checks for a card update triggering event, which includes the second device (e.g., merchant point-of-sale device 201) searching a remote database (e.g., database 305) for triggering event data via communication network 309. Specifically, as described by step 112, the second device searches for card update data (e.g., a graphical images, animations, notification sounds), triggering data, and persistence policy data in database 305 to deliver to the first device. In some embodiments, card update data, triggering data, and persistence policy data may be referred to as interactivity data as described herein. In some embodiments, the virtual wallet application checking for a card update triggering event may include the first device (e.g., user equipment 200) searching for contextual data (e.g., weather data, global positioning system (GPS) data, proximity data to a known device, and/or connected device data) pertinent to the first device's current location. At step 114, the first device determines whether any interactivity data (e.g., card update data, triggering data, persistence policy data, etc.) is received from the second device. If the first device does not receive interactivity data from the second device, system 100 proceeds to step 116, where no payment card update occurs, or a default animation occurs. For example, after the first device completes the transaction with the second device, the first representation 108 of Mickey Mouse may remain motionless and/or a default check mark animation may appear below the payment card within the virtual wallet application, signifying confirmation of the completed transaction.

If the first device receives interactivity data from the second device, system 100 proceeds to step 118, where a payment card update (e.g., a graphical image update, an animation, and/or a notification sound) occurs and, as depicted by step 120, the first device generates for display, via display 212, a second representation 126 of the payment card within the virtual wallet application. The second representation 126 depicts an animation of Mickey Mouse dancing to confirm that the transaction using the payment card between the first device (e.g., user equipment 200) and the second device (e.g., merchant point-of-sale device 201) is complete 122. In some embodiments, where the received interactivity data includes notification sound data, the first device, while presenting the second representation 126 of the virtual payment card via display 212, may play an audio alert related to the second representation 126 via audio output equipment 214 (e.g., speakers and/or headphones). For example, while generating for display an animation of Mickey Mouse dancing as the card image for the virtual payment card, the first device may concurrently play the audio alert "When you wish upon a star" to create an immersive, enjoyable experience for a user. It will be understood that first representation 108 and second representation 126 may respectively be referred to as first content and second content, as described herein. In some embodiments, the second content may be any audio, graphic image, animation, etc. that enhances the first content (e.g., a static image of Mickey Mouse). For example, the second content may include Mickey Mouse saying, "All you need is a little bit of magic" when a transaction is completed. In some embodiments, the second content may include an animation (e.g., Buzz Lightyear launching into space) that is triggered in certain circumstances (e.g., when the transaction involving the virtual payment card falls within a qualified category for a rewards program). In some embodiments, the received interactivity data may include graphical image data (e.g., card image data) such that the second representation 126 of the virtual payment card generated for display by the first device may be a brand design (e.g., a second image). For example, if the first device completes a contactless transaction with a second device at a Nike outlet store, the first device may change the card image of the payment card within the virtual wallet application to a Nike logo design to confirm that the transaction is complete. In some embodiments, while generating for display the Nike logo design as the card image for the virtual payment card, the first device may concurrently play the audio alert "Just do it" to create an immersive experience for the user. In some embodiments, second representation 126 may be interactive such that, in response to a selection of second representation 126, the user device may generate for display a relevant web page and/or eCommerce platform. In some embodiments, second representation 126 may be characterized as advertisement content. For example, in response to a completed transaction at a Nike outlet store, second representation 126 may include an animation of Nike running shoes on sale for a threshold amount of time (e.g., 15 minutes) after the completed transaction. Accordingly, if the user device receives a selection of the animation of the Nike running shoes within the threshold amount of time, the user device may generate for display the Nike web store where the running shoes may be bought at a discounted price (e.g., 15% off).

Figure 2:
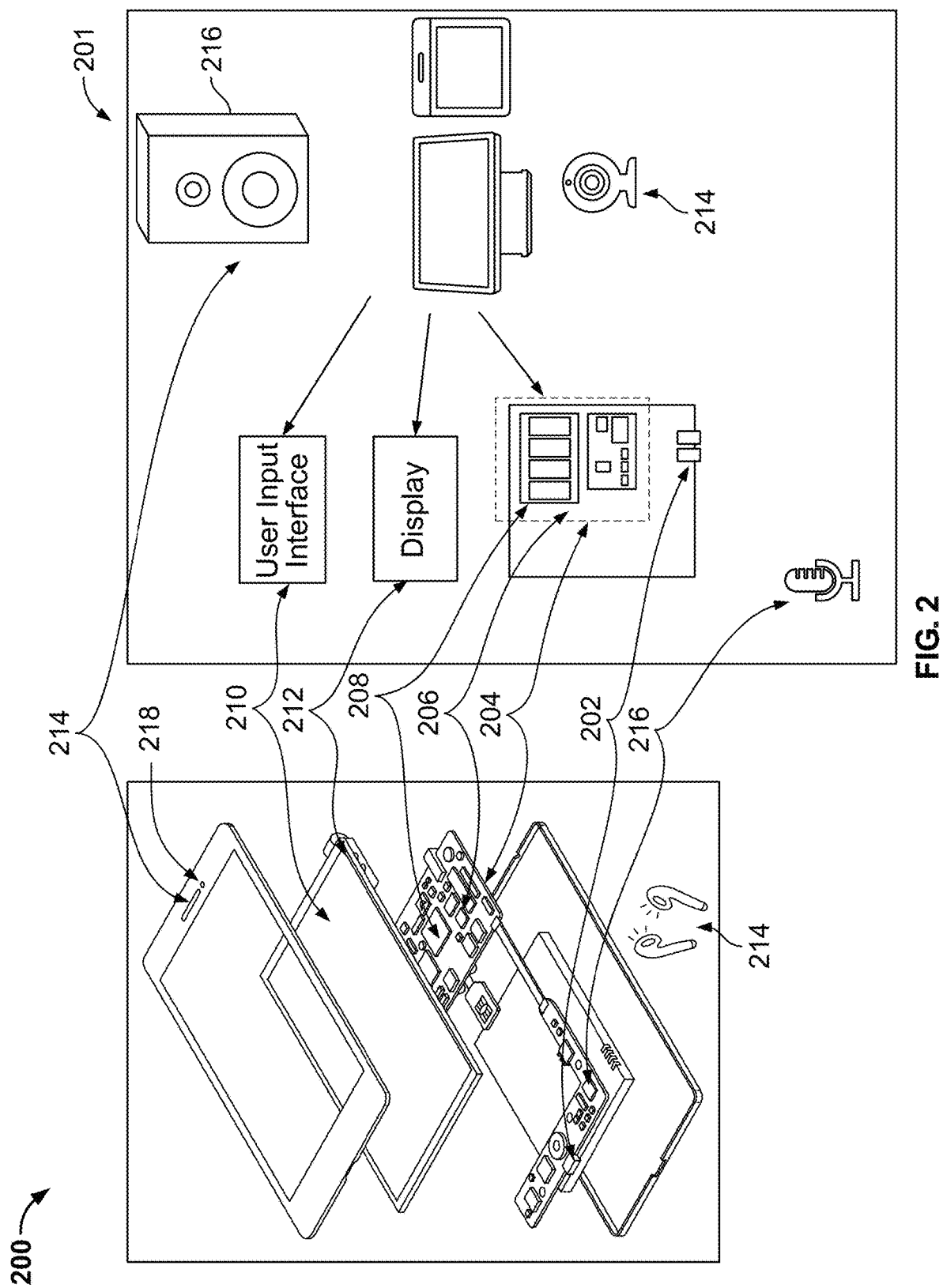
FIGS. 2-3 show illustrative devices, systems, servers, and related hardware for confirming a completed transaction between a user device and a merchant point-of-sale device via a representation of a virtual payment card, in accordance with some embodiments of the present disclosure.
Figure 3:
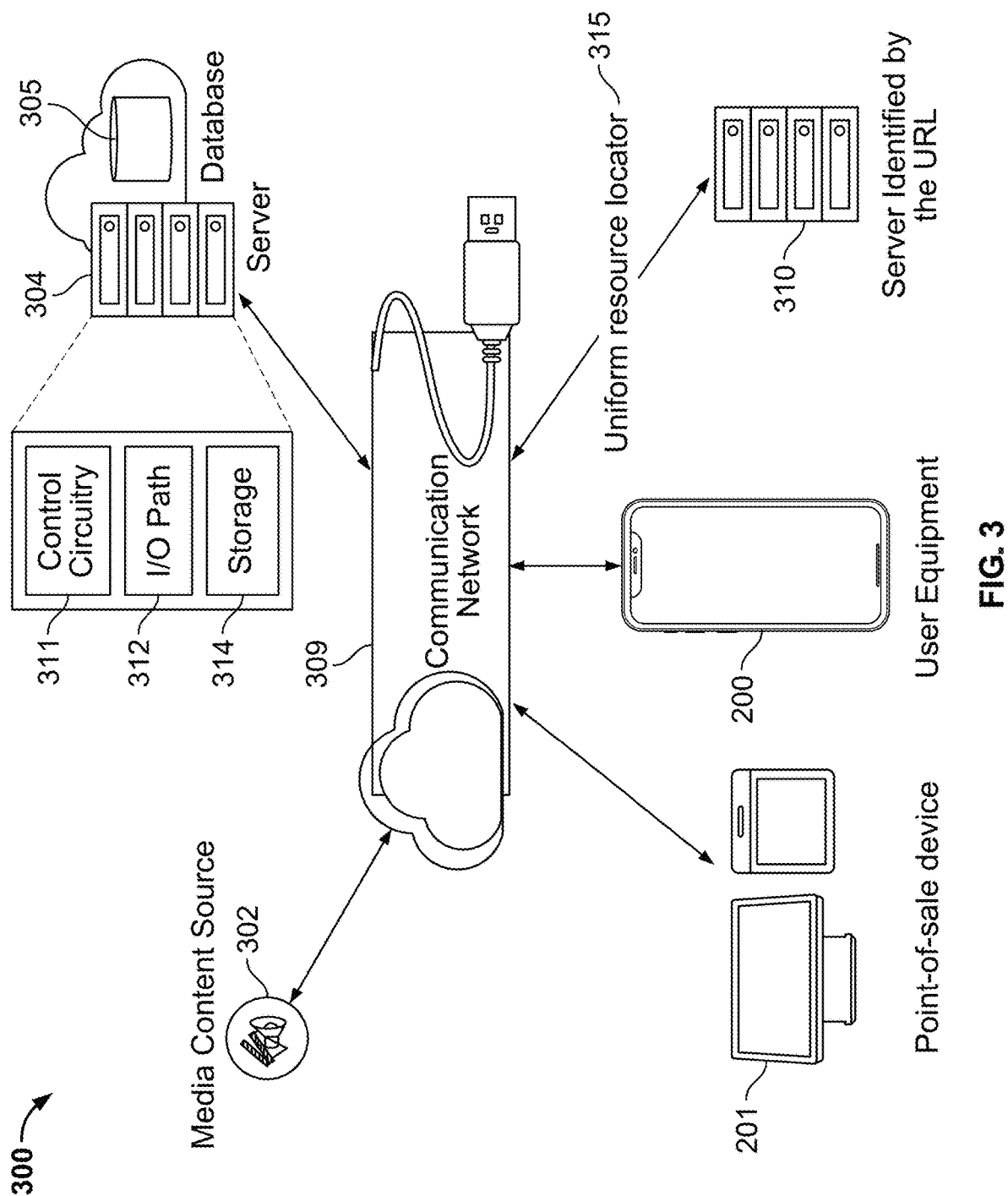

FIGS. 2-3 show illustrative devices, systems, servers, and related hardware for confirming a completed transaction between a user device and a merchant point-of-sale device via a representation of a virtual payment card, in accordance with some embodiments of the present disclosure. FIG. 2 shows generalized embodiments of illustrative user equipment 200 and merchant point-of-sale device 201, which may correspond to, e.g., the first device and the second device described above. It will be understood that user equipment 200 may be referred to as a user device as described herein. In some embodiments, user equipment 200 may be a smartphone device, a tablet, a near-eye display device, a smartwatch, or any other suitable device capable of participating in a transaction, data transfer, or other media communication session (e.g., in real time or otherwise) over a communication network. Merchant point-of-sale device 201 may be communicatively connected to microphone 216, audio output equipment 214 (e.g., speaker or headphones), and display 212. In some embodiments, display 212 may be a computer display, tablet display, smartphone display, or smartwatch display. In some embodiments, merchant point-of-sale device 201 may be communicatively connected to user input interface 210. In some embodiments, user input interface 210 may be a remote-control device. Merchant point-of-sale device 201 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment 200 and merchant point-of-sale device 201 are discussed below in connection with FIG. 3. In some embodiments, user equipment 200 may comprise any suitable number of sensors (e.g., gyroscope or gyrometer, accelerometer, NFC-based sensor, etc.), and/or a GPS module (e.g., in communication with one or more servers and/or cell towers and/or satellites) to ascertain a location of user equipment 200. In some embodiments, user equipment 200 comprises a rechargeable battery that is configured to provide power to the components of the device.

Each one of user equipment 200 and merchant point-of-sale device 201 may receive content and data via input/output path 202. I/O path 202 may provide content (e.g., content available over a personal area network (PAN), local area network (LAN), or wide area network (WAN) and/or other content) and data to control circuitry 204, which may comprise processing circuitry 206 and storage 208. Control circuitry 204 may be used to send and receive commands, requests, and other suitable data using I/O path 202, which may comprise I/O circuitry. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing. While merchant point-of-sale device 201 is shown in FIG. 2 for illustration, any suitable computing device having processing circuitry, control circuitry, and storage may be used in accordance with the present disclosure. For example, merchant point-of-sale device 201 may be replaced by, or complemented by, a personal computer (e.g., a notebook, a laptop, a desktop), a smartphone (e.g., user equipment 200), a network-based server hosting a user-accessible client device, a non-user-owned device, any other suitable device, or any combination thereof.

Control circuitry 204 may be based on any suitable control circuitry such as processing circuitry 206. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Server 304 may be a part of a local area network with one or more of user equipment 200 and merchant point-of-sale device 201 or may be a part of a cloud computing environment accessed via the Internet. In a cloud computing environment, various types of computing services for performing searches on the Internet or informational databases, providing storage (e.g., for a database) or parsing data are provided by a collection of network-accessible computing and storage resources (e.g., server 304 and/or an edge computing device), referred to as "the cloud." Merchant point-of-sale device 201 may be a cloud client that relies on the cloud computing capabilities from server 304 to determine whether a particular portion of interactivity data (e.g., animation data, notification sound data, card image data, triggering data, persistence policy data, advertising data, transaction goal data, etc.) or any other suitable data should be provided to user equipment 200 to actuate a representation of the virtual payment card. In some embodiments, user equipment 200 may be a cloud client that relies on the cloud computing capabilities from server 304 to retrieve contextual data and/or payment card transaction data.

Control circuitry 204 may include communications circuitry suitable for communicating with server 304, edge computing systems and devices, a table or database server, or other networks or servers (e.g., server 310 via uniform resource locator (URL) 315). The instructions for carrying out the above-mentioned functionality may be stored on a server (which is described in more detail in connection with FIG. 3). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 3). In addition, communications circuitry may include circuitry that enables peer-to-peer communication of user devices, or communication of user devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein (e.g., animation data, notification sound data, card image data, triggering data, persistence policy data, advertising data, transaction goal data, payment card transaction data, contextual data, etc.). Nonvolatile memory may also be used (e.g., to launch a boot-up routine and other instructions). Cloud-based storage, described in relation to FIG. 2, may be used to supplement storage 208 or instead of storage 208.

Control circuitry 204 may include video generating circuitry and tuning circuitry, such as one or more analog tuners, one or more MPEG-2 decoders, one or more HEVC decoders, or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 204 may also include scaler circuitry for upconverting and downconverting content into the preferred output format of user equipment 200. Control circuitry 204 may also include digital-to-analog converter circuitry and analog-to-digital converter circuitry for converting between digital and analog signals. The tuning and encoding circuitry may be used by user equipment 200 and merchant point-of-sale device 201 to receive and to display, to play, or to record content. The tuning and encoding circuitry may also be used to receive interactivity data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

Control circuitry 204 may receive instruction from a user by way of user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of each one of user equipment 200 and merchant point-of-sale device 201. For example, display 212 may be a touchscreen or touch-sensitive display. In such circumstances, user input interface 210 may be integrated with or combined with display 212. In some embodiments, user input interface 210 includes a remote-control device having one or more microphones, buttons, keypads, any other components configured to receive user input, or combinations thereof. For example, user input interface 210 may include a handheld remote-control device having an alphanumeric keypad and option buttons. In a further example, user input interface 210 may include a handheld remote-control device having a microphone and control circuitry configured to receive and identify voice commands and transmit information to merchant point-of-sale device 201.

Audio output equipment 214 may be integrated with or combined with display 212. Display 212 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 212. Audio output equipment 214 may be provided as integrated with other elements of each one of user equipment 200 and merchant point-of-sale device 201 or may be stand-alone units. An audio component of alerts and other content displayed on display 212 may be played through speakers (or headphones) of audio output equipment 214. In some embodiments, audio may be distributed to a receiver (not shown), which processes and outputs the audio via speakers of audio output equipment 214. In some embodiments, for example, control circuitry 204 is configured to provide audio cues to a user, or other audio feedback to a user, using speakers of audio output equipment 214. There may be a separate microphone 216 or audio output equipment 214 may include a microphone configured to receive audio input such as voice commands or speech. For example, a user may speak letters or words that are received by the microphone and converted to text by control circuitry 204. In a further example, a user may voice commands that are received by a microphone and recognized by control circuitry 204. In some instances, a voice command may be used to facilitate an authentication process related to payments involving the described virtual cards (e.g., a user might be prevented from making a payment if he fails an authentication process). Camera 218 may be any suitable video camera integrated with the equipment or externally connected. Camera 218 may be a digital camera comprising a charge-coupled device (CCD) and/or a complementary metal-oxide semiconductor (CMOS) image sensor. Camera 218 may be an analog camera that converts to digital images via a video card. In some instances, the camera 218 may be used to capture an image of the user (e.g., of the user's face). The captured image may be used to facilitate an authentication process related to payments involving the described virtual cards. In some instances, the camera 218 may be used to capture gestures made by the user, which may be used to facilitate a payment made with a virtual card or to facilitate an authentication process.

Instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 204 may allow a user to provide user profile information or may automatically compile user profile information. For example, control circuitry 204 may access and monitor network data, animation data, notification sound data, card image data, contextual data, processing data, and payment card transaction data from user equipment 200—including a virtual payment card. Control circuitry 204 may obtain all or part of other user profiles that are related to a particular user (e.g., via contextual data, including connected device data and/or proximity data to known devices), and/or obtain information about the user from other sources that control circuitry 204 may access. As a result, a user can be provided with a unified experience across the user's different devices.

FIG. 3 is a diagram of an illustrative system 300 for enabling a representation of a virtual payment card in response to a completed transaction, in accordance with some embodiments of this disclosure. User equipment 200, merchant point-of-sale device 201, and server 310 may be coupled to communication network 309. Communication network 309 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 309) may separately or collectively include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 3 to avoid overcomplicating the drawing.

Although communications paths are not drawn between user equipment 200 and merchant point-of-sale device 201, these devices may communicate directly with each other via communications paths as well as other short-range, point-to-point communications paths, such as USB cables, IEEE 1394 cables, wireless paths (e.g., Bluetooth, infrared, IEEE 702-11x, near-field communication (NFC), etc.), or other short-range communication via wired or wireless paths. User equipment 200 and merchant point-of-sale device 201 may also communicate with each other directly through an indirect path via communication network 309.

System 300 may comprise media content source 302, one or more servers 304, and/or one or more edge computing devices. In some embodiments, the media content source 302 and/or server 304 may be configured to host or otherwise facilitate transactions and/or data transfer between user equipment 200, merchant point-of-sale device 201, and server 310 and/or any other suitable user devices, and/or host or otherwise be in communication (e.g., over network 309) with one or more social network services.

In some embodiments, server 304 may include control circuitry 311 and storage 314 (e.g., RAM, ROM, Hard Disk, Removable Disk, etc.). Storage 314 may store one or more databases. In some embodiments, storage 314 may store instructions that when executed by control circuitry 311 run a virtual wallet application, as described in other figures. Server 304 may also include an input/output path 312. I/O path 312 may provide interactivity data, device information, or other data, over a personal area network (PAN), local area network (LAN), or wide area network (WAN), and/or other content and data to control circuitry 311, which may include processing circuitry, and storage 314. In some embodiments, I/O path 312 may include any suitable circuitry (e.g., control circuitry, processing circuitry, etc.). Control circuitry 311 may be used to send and receive commands, requests, and other suitable data using I/O path 312, which may comprise I/O circuitry. I/O path 312 may connect control circuitry 311 (and specifically control circuitry) to one or more communications paths. In some embodiments, server 310 may include a similar architecture to server 304.

In some embodiments, user equipment 200 and merchant point-of-sale device 201 may comprise device drivers, e.g., a video capture driver, an audio capture driver, or any other suitable driver, or any combination thereof, to interface with sensors of user equipment 200. For example, the video capture driver may comprise any suitable combination of hardware or software to interface with an image sensor (e.g., camera 218) configured to capture images of an environment surrounding user equipment 200 and merchant point-of-sale device 201. In some embodiments, the audio capture driver may comprise any suitable combination of hardware or software to interface with a microphone (e.g., microphone 216) configured to capture ambient audio of an environment surrounding user equipment 200 and merchant point-of-sale device 201. In some embodiments, the video capture driver may be configured to receive requests for image data (e.g., video and/or other imagery) from user equipment 200 and/or merchant point-of-sale device 201.

Control circuitry 311 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 311 executes instructions for an emulation system application stored in memory (e.g., the storage 314). Memory may be an electronic storage device provided as storage 314 that is part of control circuitry 311.

Figure 4:
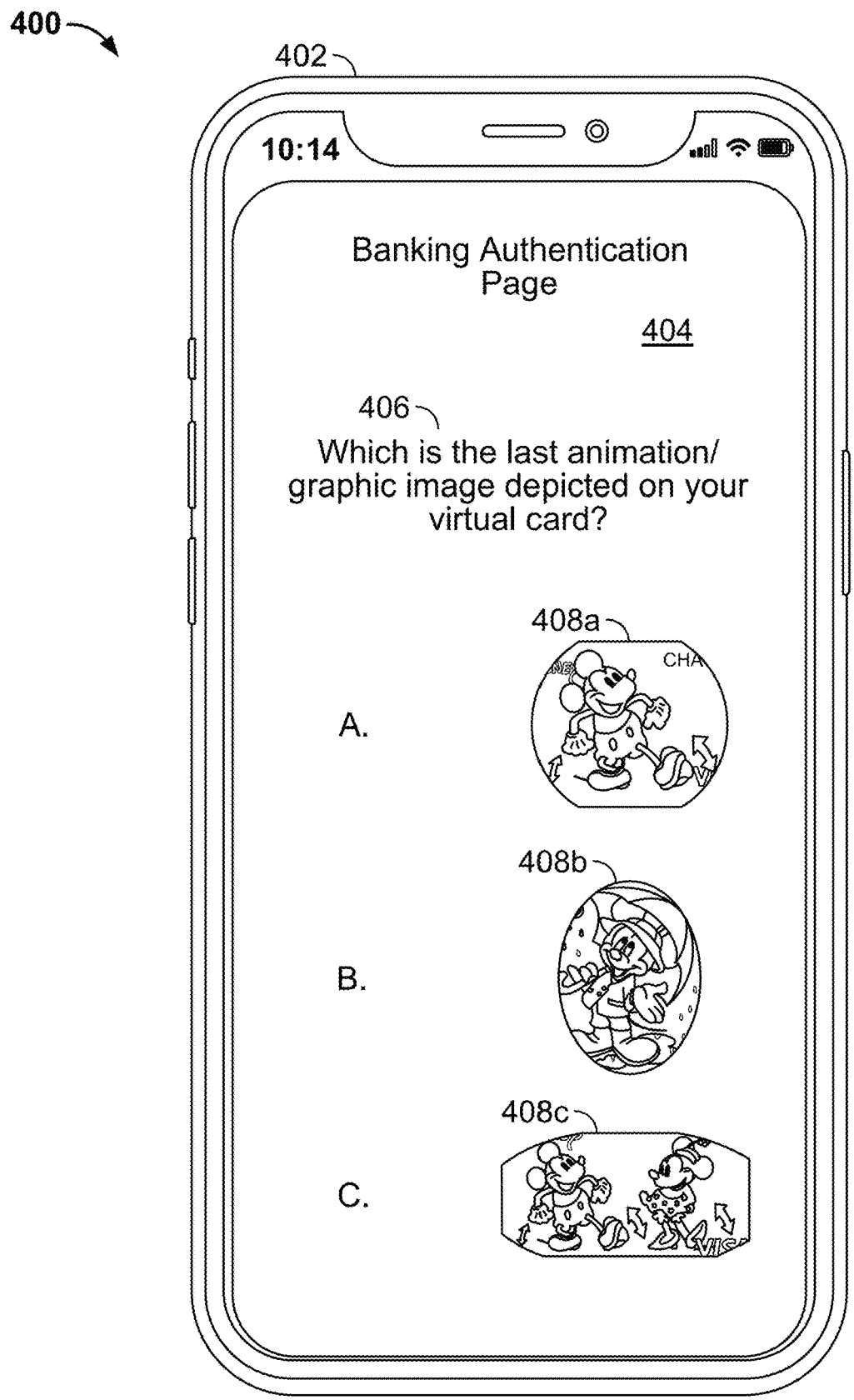
FIG. 4 shows an illustrative graphical user interface for multi-step authentication, in accordance with some embodiments of the present disclosure.

FIG. 4 shows an illustrative graphical user interface (GUI) for multi-step authentication, in accordance with some embodiments of the present disclosure. In some embodiments, GUI 404 may appear after an initial log-in page, generated for display by user device 402 (e.g., corresponding to user equipment 200), requests profile credentials (e.g., a username and password) to access an account associated with a virtual payment card. System 400 adds an additional layer of security in the instance log-in credentials for a bank account associated with the virtual payment card are disclosed. In some embodiments, GUI 404 may include any number of options when requesting a selection of a second representation to confirm a most recent transaction.

User device 402 generates for display, via display 212, GUI 404 after receiving correct log-in credentials for a bank account associated with the virtual payment card. Text element 406 prompts a question regarding a second representation or graphic image associated with the most recent transaction involving the virtual payment card (e.g., representation 126 provided by step 120 of FIG. 1 or graphic image 606 provided by FIG. 6B), and user device 402 generates for display, via GUI 404, second representations 408a-408c as options to be selected, via user input interface 210, to confirm the identity of the user attempting to access the bank account. One of the second representations 408a-408c matches the second representation associated with the most recent transaction involving the virtual payment card, while the remaining two representations 408a-408c are alternative representations of the virtual payment card that were not generated for display during previous transactions using the payment card. In some embodiments, the alternative representations of the virtual payment card may be fake and may have never been generated for display during previous transactions using the payment card. In some embodiments, the second representation associated with the most recent transaction of the payment card may be an animation of Mickey Mouse dancing as the card image (e.g., second representation 408a), in which case a selection of option A (e.g., received via user input interface 210) would authenticate the identity of the user, and user device 402 would grant the user access to a bank account associated with the virtual payment card. In some embodiments, other animations with non-Disney characters and/or graphic images may be used. It will be understood that merchant point-of sale device 201 may retrieve interactivity data (e.g., animation data, notification sound data, card image data, triggering data, persistence policy data, advertising data, transaction goal data, etc.) from server 304 (with access to database 305) via communication network 309, deliver the interactivity data to user device 402 (e.g., corresponding to user equipment 200) via communication network 309—in response to a completed transaction between user device 402 and merchant point-of-sale deice 201—and actuate second representation 408a as the card image for the virtual payment card. In some embodiments, merchant point-of-sale device 201 may pass uniform resource locator (URL) 315 to access server 310, retrieve interactivity data, and deliver the interactivity data to user device 402 to actuate second representation 408a as the card image for the virtual payment card. In some embodiments, the second representation associated with the most recent transaction of the payment card may be an animation of Mickey Mouse with an umbrella, rain jacket, and rain boots beneath a cloud getting rained on (e.g., second representation 408b), in which case a selection of option C. (e.g., second representation 408c-Mickey Mouse dancing next to Minnie Mouse), via user input interface 210, would prevent the user from gaining access to the bank account associated with the virtual payment card. In some embodiments, user device 402 may present graphic images (e.g., brand logo designs), based on received card image data, as one of the second representations 408a-408c to verify user identity. For example, if the last transaction using the payment card was at a Louis Vuitton store, GUI 404 may display, via display 212, a card image with the Louis Vuitton brand design as one of the second representations 408a-408c to authenticate the user's identity and prevent unauthorized access into the bank account associated with the payment card.

Figure 5:
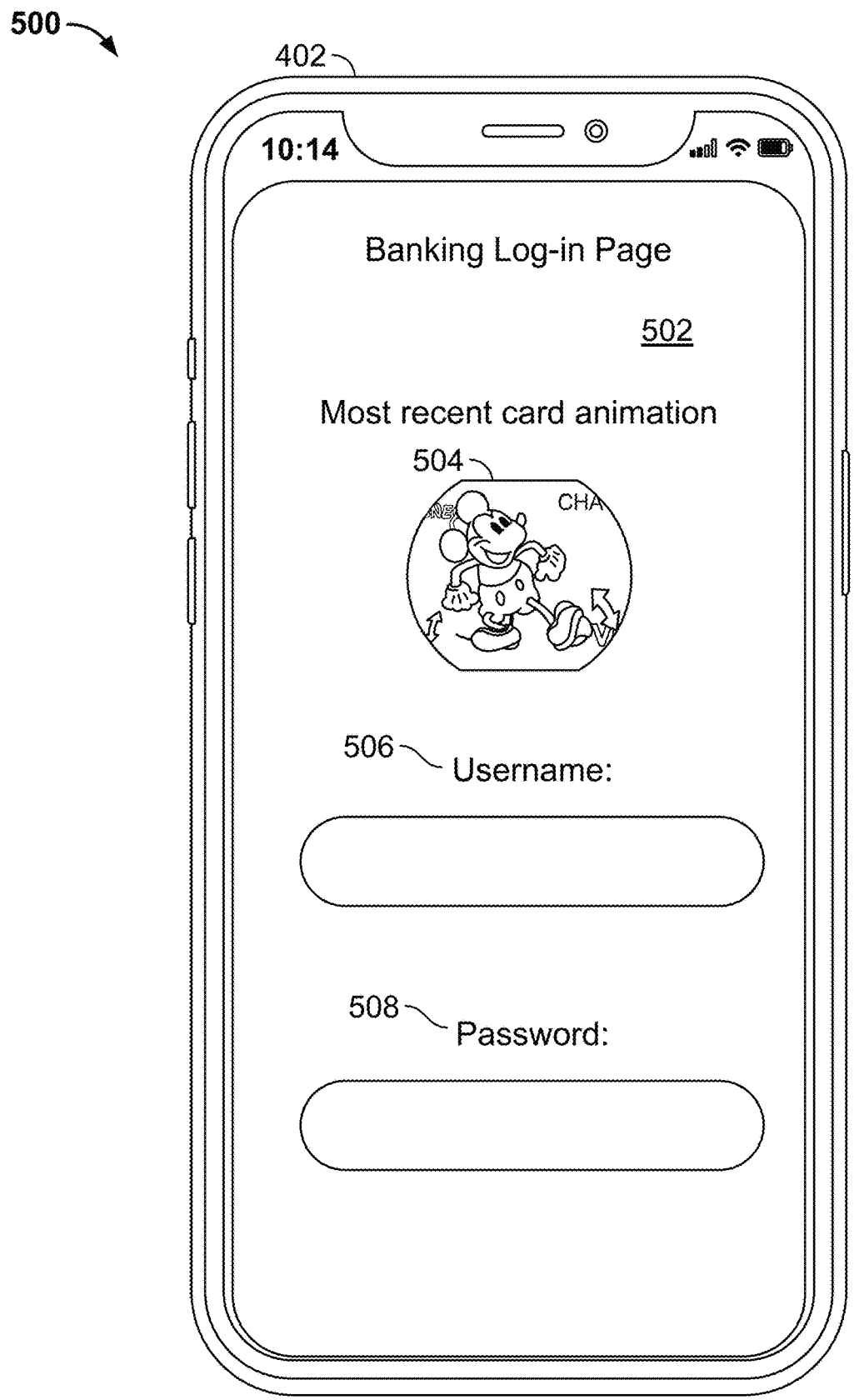
FIG. 5 shows an illustrative graphical user interface for combating phishing, in accordance with some embodiments of the present disclosure.

FIG. 5 shows an illustrative graphical user interface (GUI) for combating phishing, in accordance with some embodiments of the present disclosure. User device 402 generates for display, via display 212, GUI 502 when requesting log-in credentials, so a user can securely access a bank account associated with the virtual payment card. The log-in credentials include username 506 and password 508, and system 500 also presents second representation 504 (e.g., representation 126 provided by step 120 of FIG. 1 or representation 906 provided by FIG. 9B) to assure the user is inputting sensitive profile information, via user input interface 210, to a secure, legitimate page associated with the banking institution that administered their virtual payment card. Second representation 504 (e.g., an animation of Mickey Mouse dancing) matches the second representation associated with the most recent transaction involving the virtual payment card, so a user will recognize second representation 504 and be sure the log-in page they are using is secure. It will be understood that merchant point-of sale device 201 may retrieve interactivity data from server 304 (with access to database 305) via communication network 309, deliver the interactivity data to user device 402 (e.g., corresponding to user equipment 200) via communication network 309—in response to a completed transaction between user device 402 and merchant point-of-sale device 201—and actuate second representation 504 as the card image for the virtual payment card. In some embodiments, merchant point-of-sale device 201 may pass uniform resource locator (URL) 315 to access server 310, retrieve interactivity data, and deliver the interactivity data to user device 402 to actuate second representation 504 as the card image for the virtual payment card. In some embodiments, GUI 502 may display, via display 212, a graphic image, based on received card image data, as second representation 504, so, for example, if the most recent transaction using the virtual payment card was at a Nike outlet store, GUI 502 may display the Nike brand design as second representation 504 to legitimize the banking log-in page. In some embodiments, in response to a user selecting a suspicious link via text message or email, user device 402 may generate for display a banking log-in page that doesn't include a second representation or includes an alternative representation of the virtual payment card that was not generated for display during previous transactions using the virtual payment card, in which case the user would be able to determine the currently presented log-in page is a phishing attempt and unsecure. It will be understood that data delivered to user device 402 as a phishing attempt may originate from an unsecure and/or fake server.

FIGS. 6A-6C show an illustrative virtual wallet application where a graphic image replaces a card image of a payment card in response to a completed transaction and transaction details are generated for display, in accordance with some embodiments of the present disclosure. In FIG. 6A, user device 402 (e.g., corresponding to user equipment 200) generates for display, via display 212, a virtual wallet application that includes a first image of a first representation 602 of a payment card. For example, the first image of the first representation 602 of the payment card may be a generic card image for a business credit card. Text element 604 instructs a user to hold user device 402 near merchant point-of-sale device 201 to initiate a transaction. In some embodiments, merchant point-of-sale device 201 may retrieve interactivity data (e.g., card image data corresponding to a Louis Vuitton merchant and notification sound data) from server 304 (with access to database 305) via communication network 309, deliver the interactivity data to user device 402 via communication network 309—in response to a completed transaction 608 between user device 402 and merchant point-of-sale device 201—and actuate a second image of a second representation 606 (e.g., a Louis Vuitton design) as the card image for the virtual payment card, as depicted by FIG. 6B. Concurrently, based on the received notification sound data from merchant point-of-sale device 201, user device 402 may play an audio alert 610 (e.g., "Je suis riche"), via audio output equipment 214 (e.g., speakers and/or headphones), with the second image of the second representation 606 of the payment card to create an immersive, enjoyable experience for the user. In some embodiments, merchant point-of-sale device 201 may pass uniform resource locator (URL) 315 to access server 310, retrieve interactivity data (e.g., card image data and notification sound data), and deliver the interactivity data to user device 402 to actuate the second image of the second representation 606 as the card image for the virtual payment card and play audio alert 610. In FIG. 6C, user device 402 generates for display, via display 212, the virtual wallet application that includes the first image of the first representation 602 of the payment card and the second image of the second representation 606 of the payment card, so the user can determine which generic brand card the second image of the second representation 606 corresponds to. In addition, user device 402 generates for display transaction details 612 associated with the second image of the second representation 606 of the payment card, which may include the balance of the transaction (e.g., $2,222.25), the status of the transaction (e.g., processing, approved, denied, etc.), merchant information, the date and/or time of the transaction, etc.

FIGS. 7A-7B show an illustrative graphical user interface for replaying a representation of a previous transaction involving the virtual payment card, in accordance with some embodiments of the present disclosure. FIG. 7A depicts user device 402 (e.g., corresponding to user equipment 200) receiving a selection 702, via user input interface 210, of a previous transaction from a list of latest transactions 704 associated with the first image of the first representation 602 of the payment card. A user selects 702, e.g., a recent transaction at a Louis Vuitton store, which prompts user device 402 to generate for display the second image of the second representation 606 (e.g., a Louis Vuitton design) of the payment card (depicted by FIG. 7B), which is based on interactivity data (e.g., card image data) received from a merchant point-of-sale device 201 at the Louis Vuitton store at the time of the transaction. In some embodiments, a user may select any previous transaction involving the virtual payment card, not just the most recent transactions, to view transaction details and re-experience the representation of the payment card. Concurrently, based on received notification sound data from the merchant point-of-sale device 201 at the Louis Vuitton store, user device 402 replays the audio alert 610 (e.g., "Je suis riche"), via audio output equipment 214 (e.g., speakers and/or headphones), with the second image of the second representation 606 to recreate the initial payment experience. User device 402 generates for display, via display 212, the first image of the first representation 602 of the payment card and the second image of the second representation 606 of the payment card, so the user can determine which generic brand card the second image of the second representation 606 of the payment card corresponds to. User device 402 also generates for display transaction details 612 associated with the second image of the second representation 606 of the payment card, which may include the balance of the transaction, the status of the transaction, merchant information, the data and/or time of the transaction, etc.

FIGS. 8A-8C show an illustrative graphical user interface for persisting a graphic image as a card image of a payment card, in accordance with some embodiments of the present disclosure. In FIG. 8A, user device 402 (e.g., corresponding to user equipment 200) generates for display, via display 212, a GUI including the first image of the first representation 602 (e.g., a generic card image) of the payment card and the second image of the second representation 606 (e.g., a Louis Vuitton design) of the payment card, so the user can determine which generic brand card the second image of the second representation 606 of the payment card corresponds to. The GUI also includes transaction details 612 associated with the second image of the second representation 606 of the payment card, which may include the balance of the transaction, the status of the transaction, merchant information, the data and/or time of the transaction, etc. In some embodiments, the user device may generate for display a persistence element 802, which, if selected, maintains the second image of the second representation 606 as the card image for the payment card in future transactions. In FIG. 8B, user device 402 receives selection 804 of persistence element 802, via user input interface 210, which, as depicted by FIG. 8C, prompts user device 402 to maintain the second image of the second representation 606 of the payment card as the card image for the payment card within the virtual wallet application 806 for future transactions. In some embodiments, user device 402, in response to selection 804 of persistence element 802, may persist an animation (e.g., Mickey Mouse dancing) as the card image for the payment card within the virtual wallet application. In some embodiments, user device 402 may maintain the second image of the second representation 606 as the card image for the virtual payment card until user device 402 receives another selection 804 of the persistence element 802. In some embodiments, user device 402 may persist the second image of the second representation 606 as the card image for the virtual payment card for a threshold period of time (e.g., one day, one week, one month, three months, etc.).

Figure 9B:
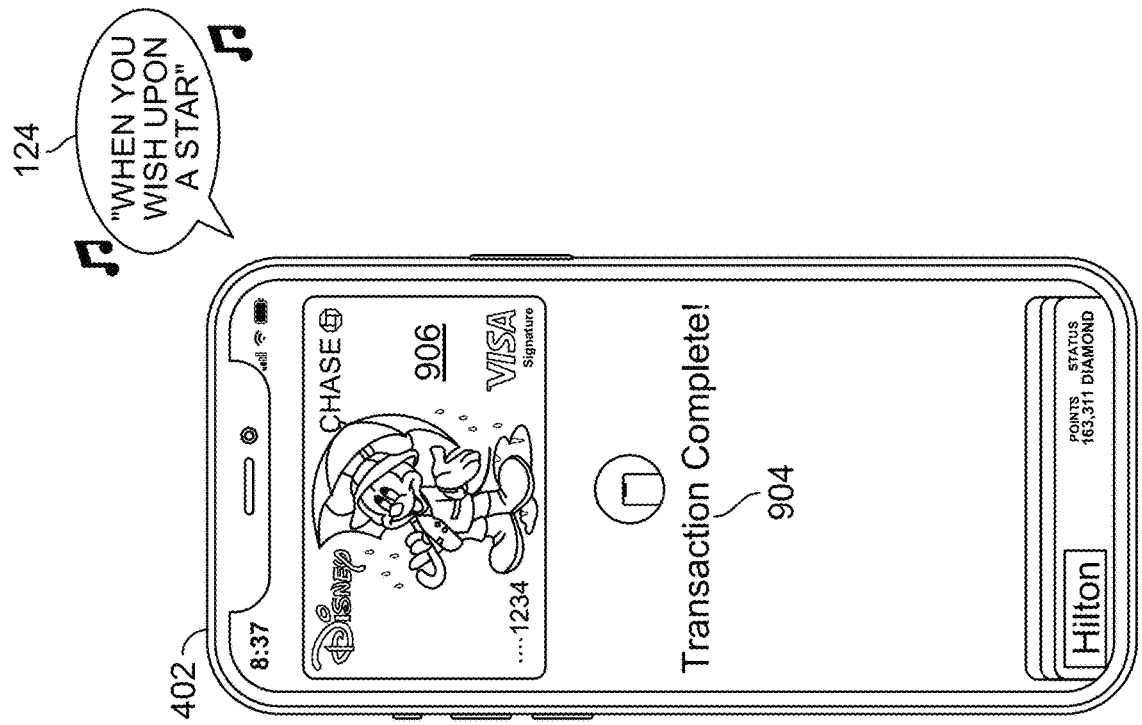
FIGS. 9A-9B show an illustrative virtual wallet application where contextual data actuates a representation of a payment card in response to a completed transaction, in accordance with some embodiments of the present disclosure.
Figure 9A:
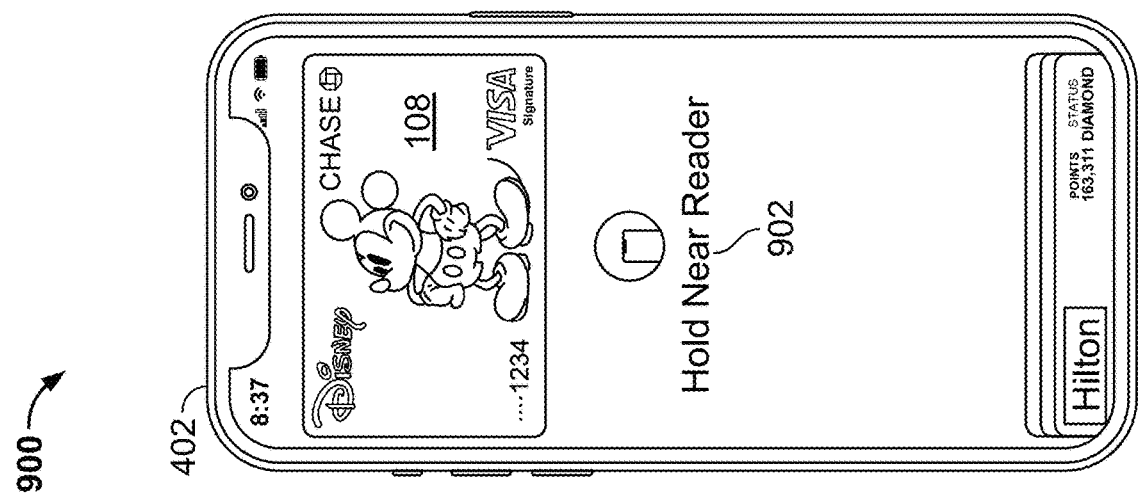

FIGS. 9A-9B show an illustrative virtual wallet application where contextual data actuates a representation of a payment card in response to a completed transaction, in accordance with some embodiments of the present disclosure. In FIG. 9A, user device 402 (e.g., corresponding to user equipment 200) generates for display, via display 212, a virtual wallet application that includes a first representation 108 (e.g., Mickey Mouse standing motionless) of the card image for the virtual payment card. Text element 902 instructs a user to hold user device 402 near merchant point-of-sale device 201 to initiate a transaction. In some embodiments, user device 402 may retrieve contextual data (e.g., weather data, global positioning system (GPS) data, proximity data to a known device, connected device data, etc.) from an external data provider (e.g., database 305 and/or server 310) via communication network 309—in response to a completed transaction 904 between user device 402 and merchant point-of-sale device 201—and actuate a second representation 906 (e.g., Mickey Mouse with a rain jacket, rain boots, and an umbrella getting rained on) as the card image for the virtual payment card, as depicted by FIG. 9B. For example, while completing a transaction with the merchant point-of-sale device 201, user device 402 may determine, via a weather application external from the virtual wallet application, that there is a high probability it will begin raining near the location of the user device 402 in the next hour. Accordingly, user device 402 may communicate the weather update to the user via the animation depicted by the second representation 906 of the payment card after the completed transaction 904. Concurrently, based on received notification sound data from the merchant point-of-sale device 201 in response to the completed transaction 904, user device 402 may play the audio alert 124 (e.g., "When you wish upon a star"), via audio output equipment 214 (e.g., speakers and/or headphones), with the second representation 906 of the payment card. In some embodiments, user device 402 may communicate any suitable weather update (e.g., snow, thunderstorm, hail, flooding, high winds, etc.) via second representation 906 of the payment card, and the second representation 906 may be associated with non-Disney characters.

Figure 10B:
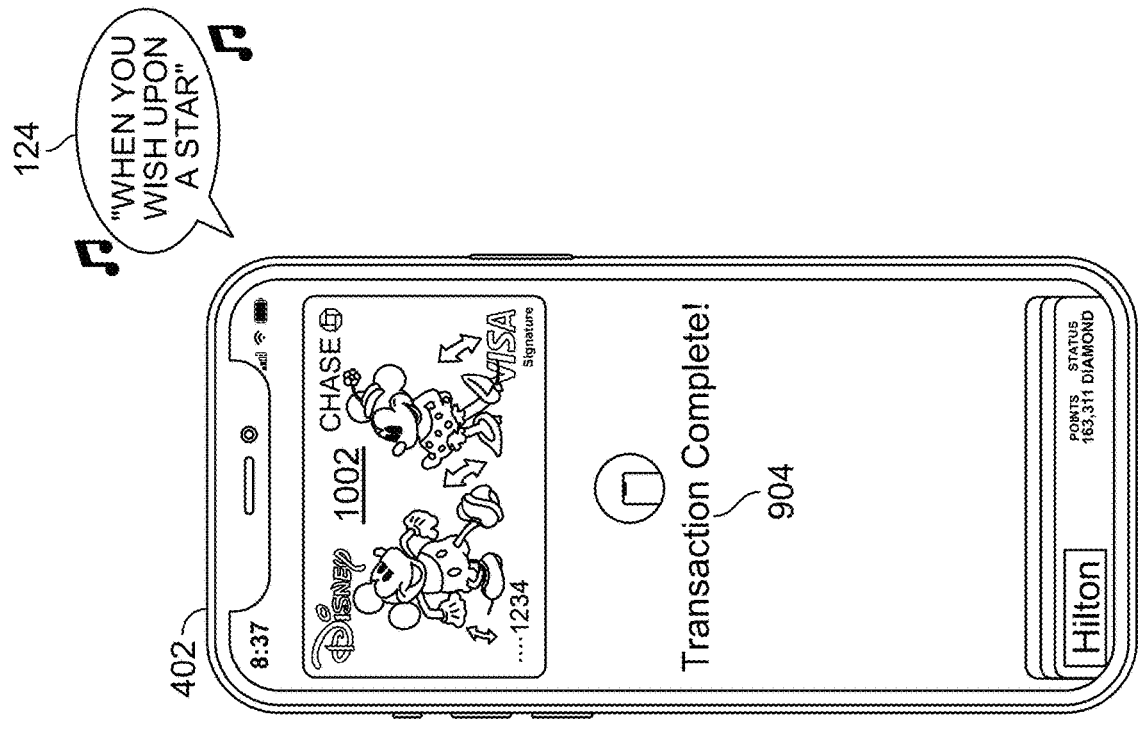
FIGS. 10A-10B show an illustrative virtual wallet application where contextual data actuates a representation of a payment card in response to a completed transaction, in accordance with some embodiments of the present disclosure.
Figure 10A:
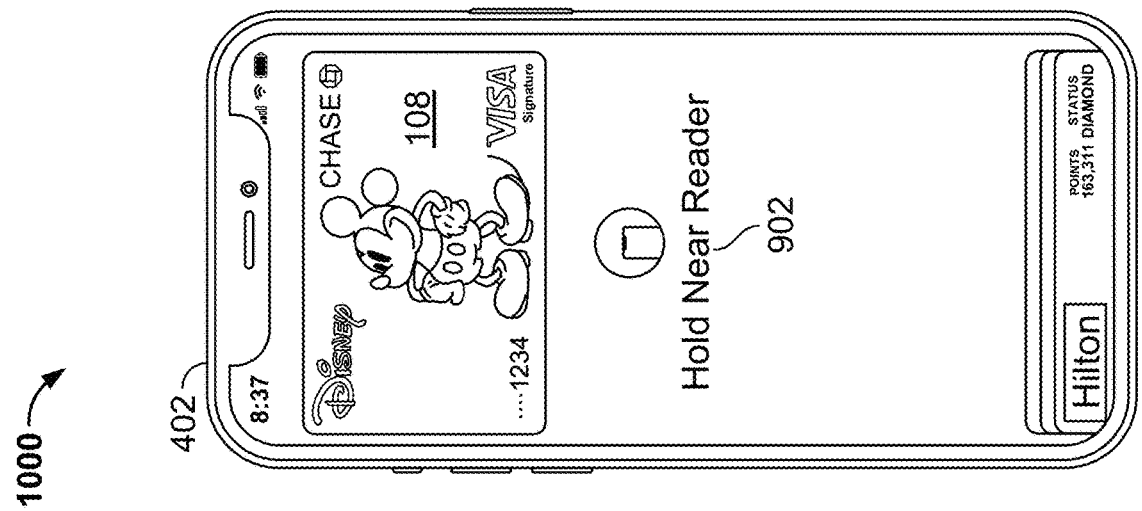

FIGS. 10A-10B show an illustrative virtual wallet application where contextual data actuates a representation of a payment card in response to a completed transaction, in accordance with some embodiments of the present disclosure. In FIG. 10A, user device 402 (e.g., corresponding to user equipment 200) generates for display, via display 212, a virtual wallet application that includes a first representation 108 (e.g., Mickey Mouse standing motionless) of the card image for the virtual payment card. Text element 902 instructs a user to hold user device 402 near merchant point-of-sale device 201 to initiate a transaction. In some embodiments, user device 402 may retrieve contextual data (e.g., weather data, global positioning system (GPS) data, proximity data to a known device, connected device data, etc.) from an external data provider (e.g., database 305 and/or server 310) via communication network 309—in response to a completed transaction 904 between user device 402 and merchant point-of-sale device 201—and actuate a second representation 1002 (e.g., Mickey Mouse dancing with Minnie Mouse) as the card image for the virtual payment card, as depicted by FIG. 10B. For example, while completing a transaction with the merchant point-of-sale device 201, user device 402 may determine, via GPS data and/or known device data, that a known device (e.g., the user's spouse, partner, sibling, child, etc.) is nearby. Accordingly, user device 402 may communicate the user's close proximity to the known device via the animation depicted by the second representation 1002 of the payment card after the completed transaction 904. Concurrently, based on received notification sound data from the merchant point-of-sale device 201 in response to the completed transaction 904, user device 402 may play the audio alert 124 (e.g., "When you wish upon a star"), via audio output equipment 214 (e.g., speakers and/or headphones), with the second representation 1002 of the payment card. In some embodiments, second representation 1002 may be associated with non-Disney characters.

Figure 11B:
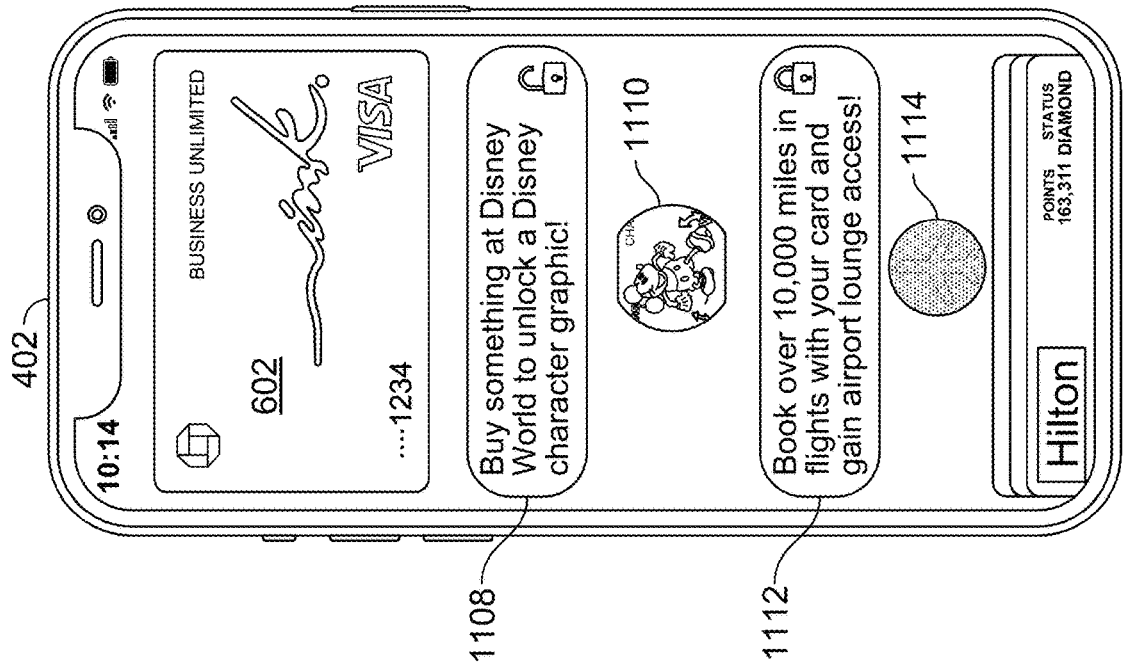
FIGS. 11A-11B show an illustrative graphical user interface for gamifying a payment card within a virtual wallet application with transaction goals, in accordance with some embodiments of the present disclosure.
Figure 11A:
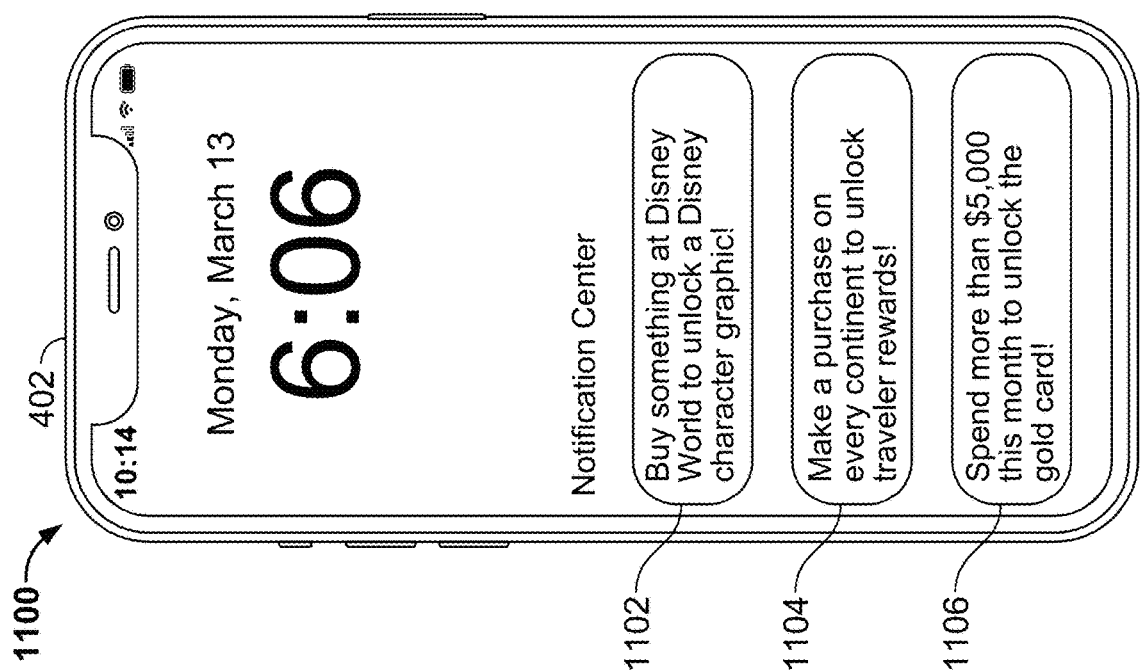

FIGS. 11A-11B show an illustrative graphical user interface for gamifying a payment card within a virtual wallet application with transaction goals, in accordance with some embodiments of the present disclosure. In FIG. 11A, user device 402 generates for display, via display 212, transaction goals 1102-1106 (e.g., Buy something at Disney World to unlock a Disney character graphic, Make a purchase on every continent to unlock traveler rewards, Spend more than $5,000 this month to unlock the gold card, etc.) in a lock screen of the user device 402 to motivate the user to upgrade, personalize, and/or unlock rewards associated with the virtual payment card via particular transactions. In some embodiments, advertisements, e.g., from previous vendors where the virtual payment card was used to purchase an item, may appear in the lock screen portrayed by FIG. 11A offering discounts, promo codes, reward points, vendor credit, holiday deals, etc. to the user. In FIG. 11B, user device 402 generates for display a virtual wallet application including the first representation 602 (e.g., a generic card image) of the payment card with transaction goals 1108 and 1112 depicted beneath. Transaction goal 1108 states, "Buy something at Disney World to unlock a Disney character graphic!", and, since user device 402 has completed a transaction with a merchant point-of-sale device 201 at Disney using the payment card, transaction goal 1108 has been unlocked and second representation 1110 (e.g., an animation of Mickey Mouse dancing) can be accessed and added to the card image of the virtual payment card for future transactions. Transaction goal 1112 states, "Book over 10,000 miles in flights with your card and gain airport lounge access!", and, since the virtual payment card has not been used in transactions amounting to more than 10,000 miles worth of flights, transaction goal 1112 remains locked and second representation 1114 (e.g., an airplane graphic image) is grayed out and inaccessible. In some embodiments, user device 402 may generate for display advertisements, e.g., from previous vendors where the virtual payment card was used to purchase an item, in the virtual wallet application of FIG. 11B beneath the first representation 602 of the virtual payment card offering discounts, promo codes, reward points, vendor credit, holiday deals, etc.

Figure 12B:
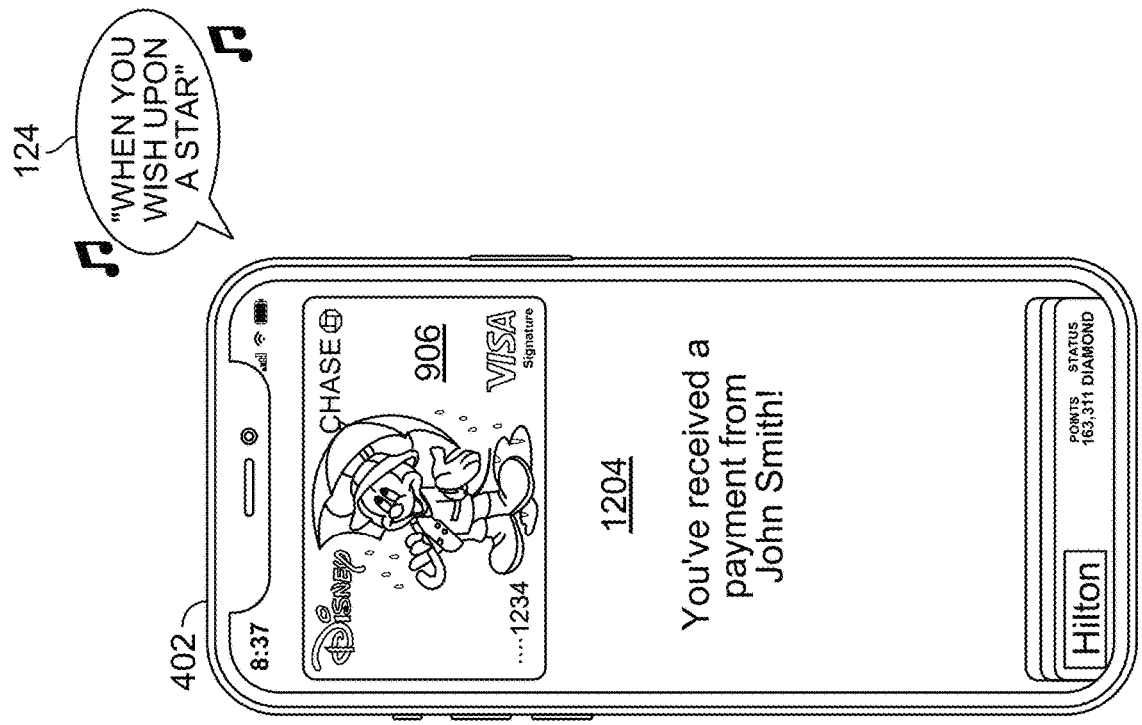
FIGS. 12A-12B show an illustrative virtual wallet application where representations of the virtual payment card are actuated based on the successful delivery or receipt of money relative to a separate user device, in accordance with some embodiments of the present disclosure.
Figure 12A:
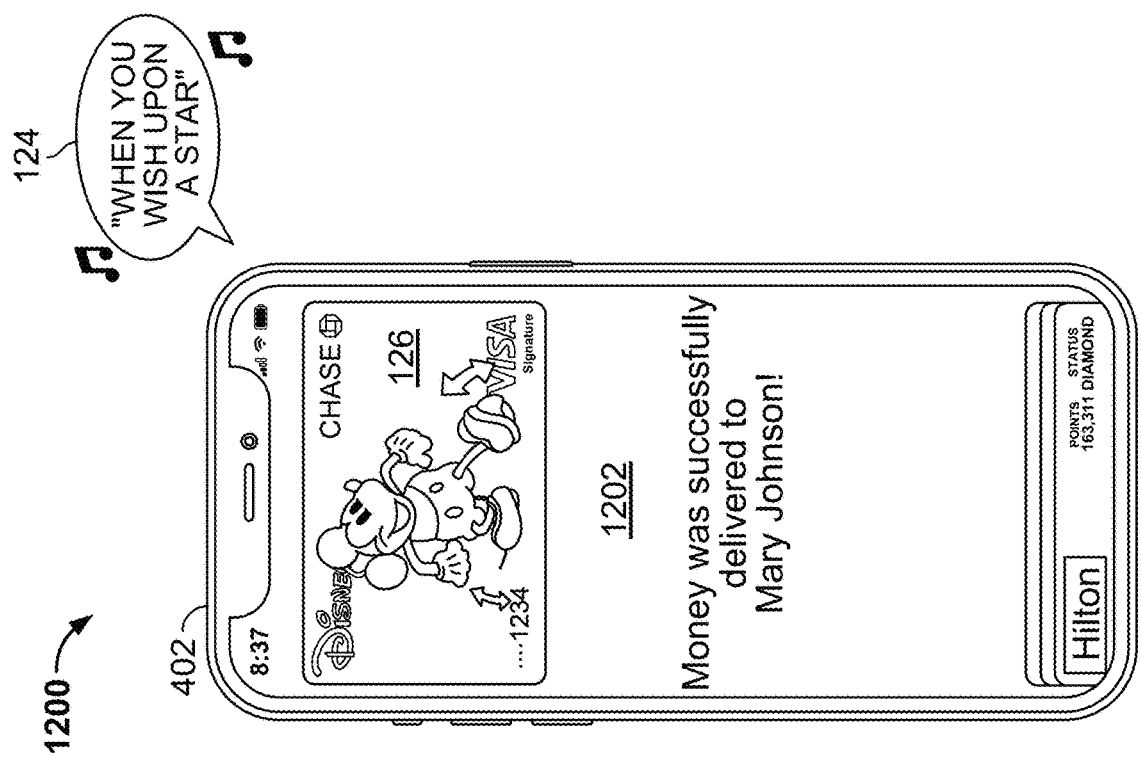

FIGS. 12A-12B show an illustrative virtual wallet application where representations of the virtual payment card are actuated based on the successful delivery or receipt of money relative to a separate user device, in accordance with some embodiments of the present disclosure. In FIG. 12A, user device 402 (e.g., corresponding to user equipment 200) generates for display, via display 212, text element 1202 within the virtual wallet application in response to successfully delivering money to a separate user device (e.g., belonging to Mary Johnson) via communication network 309. In some embodiments, user device 402 may retrieve interactivity data (e.g., animation data and notification sound data) from server 304 (with access to database 305) via communication network 309—in response to the successful delivery of money by user device 402—and actuate representation 126 (e.g., an animation of Mickey Mouse dancing) as the card image for the virtual payment card. In some embodiments, user device 402 may pass URL 315 to access server 310, retrieve interactivity data, and actuate representation 126 based on the retrieved interactivity data from server 310. Concurrently, based on the retrieved notification sound data from server 304 (with access to database 305) via communication network 309, user device 402 may play the audio alert 124 (e.g., "When you wish upon a star"), via audio output equipment 214 (e.g., speakers and/or headphones), with the representation 126 of the payment card. In FIG. 12B, user device 402 generates for display text element 1204 within the virtual wallet application in response to successfully receiving money from a separate user device (e.g., belonging to John Smith) via communication network 309. In some embodiments, user device 402 may retrieve contextual data (e.g., weather data, global positioning system (GPS) data, proximity data to a known device, connected device data, etc.) from an external data provider (e.g., database 305 and/or server 310) via communication network 309—in response to the successful receipt of money by user device 402—and actuate representation 906 (e.g., Mickey Mouse with a rain jacket, rain boots, and an umbrella) as the card image for the virtual payment card to communicate impending weather conditions to the user. Concurrently, based on retrieved notification sound data from server 304 (with access to database 305) via communication network 309, user device 402 may play the audio alert 124 (e.g., "When you wish upon a star"), via audio output equipment 214 (e.g., speakers and/or headphones), with the representation 906 of the payment card.

FIGS. 13A-13B show an illustrative virtual wallet application where a representation of a virtual payment card confirms a completed transaction within a connected user device, in accordance with some embodiments of the present disclosure. In FIG. 13A, connected user device 1302 (e.g., corresponding to user equipment 200) generates for display, via display 212, a virtual wallet application that includes a first representation 108 (e.g., Mickey Mouse standing motionless) of a virtual payment card. Text element 1304 instructs a user to hold connected user device 1302 (e.g., a smartwatch) near merchant point-of-sale device 201 to initiate a transaction. In some embodiments, merchant point-of-sale device 201 may retrieve interactivity data (e.g., animation data, notification sound data, card image data, triggering data, persistence policy data, advertising data, transaction goal data, etc.) from server 304 (with access to database 305) via communication network 309, deliver the interactivity data to connected user device 1302 via communication network 309—in response to a completed transaction 1306 between connected user device 1302 and merchant point-of-sale device 201—and actuate a second representation 126 (e.g., an animation of Mickey Mouse dancing) as the card image for the virtual payment card, as depicted by FIG. 13B. Concurrently, based on the received notification sound data from merchant point-of-sale device 201, connected user device 1302 may play the audio alert 124 (e.g., "When you wish upon a star"), via audio output equipment 214 (e.g., speakers and/or headphones), with the second representation 126 of the virtual payment card to create an immersive, enjoyable experience for the user. In some embodiments, merchant point-of-sale device 201 may pass URL 315 to access server 310, retrieve interactivity data (e.g., animation data and notification sound data), and deliver the interactivity data to connected user device 1302 to actuate the second representation 126 as the card image for the virtual payment card and play audio alert 124. In some embodiments, in response to a completed transaction 1306 between the connected user device 1302 and the merchant point-of-sale device 201, merchant point-of-sale device 201 may deliver card image data such that a vendor brand design (e.g., a Nike logo design) replaces the card image of the virtual payment card. In some embodiments, connected user device 1302 may be any suitable connected device including a tablet, laptop, etc. In some embodiments, connected user device 1302 may retrieve contextual data (e.g., weather data, GPS data, proximity data to a known device, connected device data, etc.) from an external data provider (e.g., database 305 and/or server 310 via communication network 309—in response to a completed transaction 1306 between connected user device 1302 and merchant point-of-sale device 201—and actuate a second representation, based on the received contextual data, as the card image for the virtual payment card.

Figure 14:
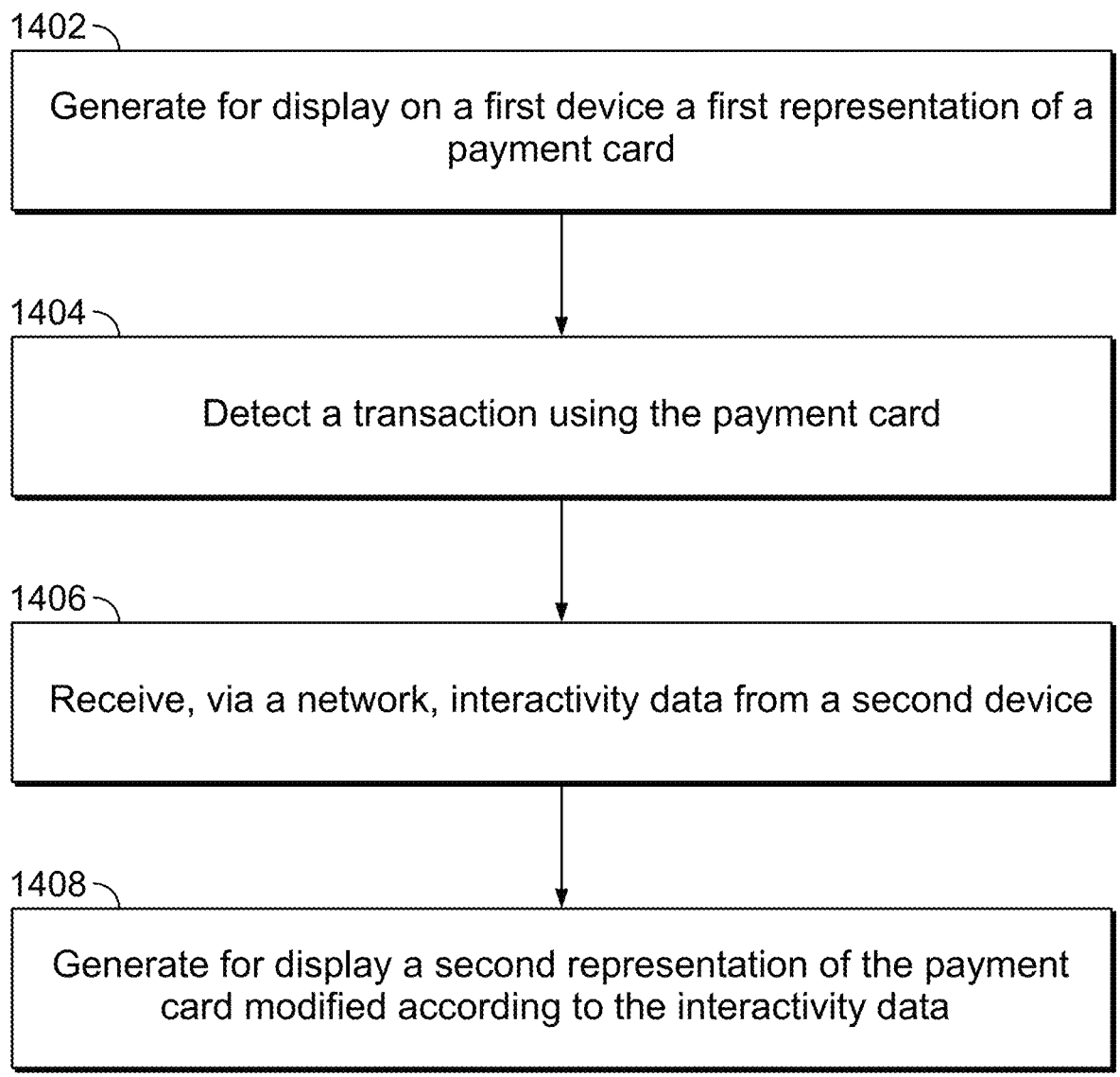
FIG. 14 is a flowchart of a detailed illustrative process for generating a second representation of a virtual payment card, in accordance with some embodiments of the present disclosure.

FIG. 14 is a flowchart of a detailed illustrative process for generating a second representation of a virtual payment card, in accordance with some embodiments of the present disclosure. At step 1402, control circuitry (e.g., I/O path 202 including control circuitry 204) generates for display, via display 212, on a first device (e.g., user device 402/user equipment 200) a first representation of a payment card. In some embodiments, the first representation of the virtual payment card may be a card image of a generic credit card (e.g., first representation 602 provided by FIG. 6A), and, in some embodiments, the first representation of the virtual payment card may be a card image of a brand (Disney, Hilton, Marriott, etc.) credit card (e.g., first representation 108 provided by step 104 of FIG. 1—a graphic of Mickey Mouse). At step 1404, control circuitry (e.g., control circuitry 204) detects a transaction using the payment card, and, at step 1406, control circuitry (e.g., I/O path 202 including control circuitry 204) receives, via a network (e.g., communication network 309), interactivity data (e.g., animation data, notification sound data, card image data, triggering data, persistence policy data, advertising data, transaction goal data, etc.) from a second device (e.g., merchant point-of-sale device 201). In some embodiments, the second device (e.g., the merchant point-of-sale device 201) retrieves the interactivity data from a server 304 (with access to a database 305) via communication network 309 and delivers the interactivity data to the first device (e.g., user device 402/user equipment 200) via communication network 309—in response to a completed transaction between the first device (e.g., user device 402/user equipment 200) and the second device (e.g., merchant point-of-sale device 200). It will be understood that server 304 may be a part of a cloud computing environment, with merchant point-of-sale device 201 as a cloud client, that searches informational databases (e.g., database 305) for interactivity data via control circuitry 311, I/O path 312, and/or storage 314.

In some embodiments, the second device (e.g., the merchant point-of-sale device 201) may pass URL 315 to access server 310, retrieve interactivity data, and deliver the interactivity data to the first device (e.g., user device 402/user equipment 200) via communication network 309. At step 1408, control circuitry (e.g., I/O path 202 including control circuitry 204) generates for display a second representation of the payment card modified according to the interactivity data. In some embodiments, the second representation of the virtual payment card may be an animation, based on received animation data, of a character (e.g., second representation 126 provided by step 120 of FIG. 1—Mickey Mouse dancing), in some embodiments, the second representation of the virtual payment card may be an animation, based on received contextual data, communicating upcoming weather conditions related to the first device's location (e.g., second representation 906 provided by FIG. 9B—Mickey mouse with an umbrella, rain jacket, and rain boots), and, in some embodiments, the second representation of the virtual payment card may be a graphic image change, based on received card image data, including a vendor brand design (e.g., second representation 606 provided by FIG. 6B—a Louis Vuitton logo design). In further embodiments, the first device (e.g., user device 402/user equipment 200) may play an audio alert, via audio output equipment 214 (e.g., speakers and/or headphones), with the second representation of the virtual payment card to create an immersive, enjoyable experience for the user (e.g., audio alert 124 provided by step 120 of FIG. 1—"When you wish upon a star"—or audio alert 610 provided by FIG. 6B—"Je suis riche."

Figure 15:
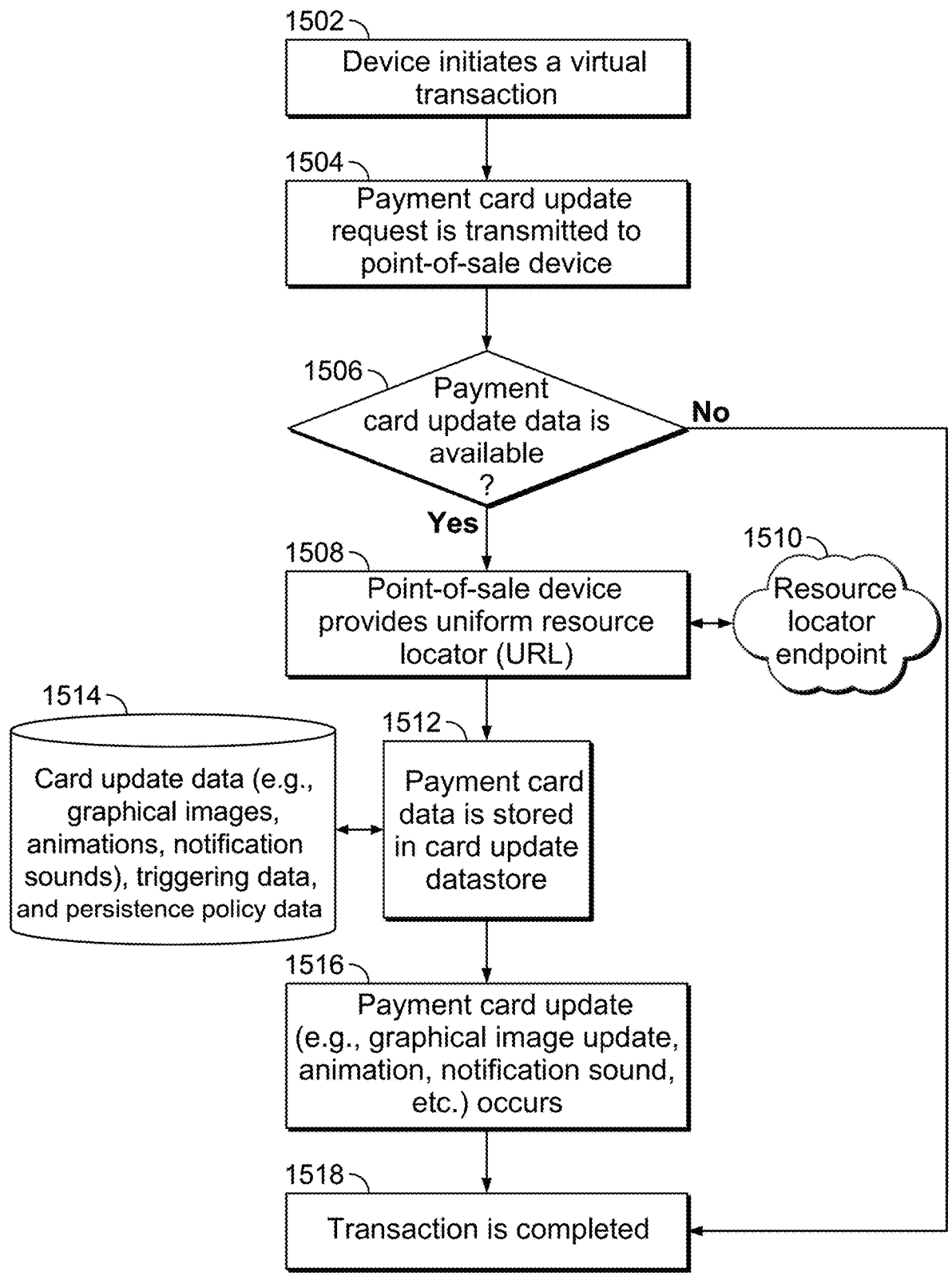
FIG. 15 is a flowchart of a detailed illustrative process for using a uniform resource locator (URL) to update a representation of a virtual payment card based on interactivity data, in accordance with some embodiments of the present disclosure.

FIG. 15 is a flowchart of a detailed illustrative process for using a uniform resource locator (URL) to update a representation of a virtual payment card based on interactivity data, in accordance with some embodiments of the present disclosure. At step 1502, a device (e.g., user device 402/user equipment 200) initiates a virtual transaction, and, at step 1506, a payment card update request is transmitted to a point-of-sale device (e.g., merchant point-of-sale device 201). In some embodiments, the first device may need to be within a threshold distance (e.g., 4 centimeters) from the point-of-sale device to initiate the virtual transaction via near-field communication (NFC) signals. Control circuitry (e.g., control circuitry 204) then proceeds to step 1506 where, if a payment card update is available (e.g., at server 310), control circuitry proceeds to step 1508. However, if a payment card update is not available at step 1506, control circuitry proceeds to step 1518 where the transaction is completed without a card image update and/or a default animation (e.g., a check mark). At step 1508, the point-of-sale device (e.g., merchant point-of-sale device 201) provides a uniform resource locator (URL) (e.g., URL 315 via communication network 309) by accessing a resource locator endpoint at step 1510, and control circuitry proceeds to step 1512 where payment card data is stored in a card update datastore (e.g., server 310). Control circuitry retrieves card update data (e.g., graphical images, animations, notification sounds), triggering data, and persistence policy data from the card update datastore (e.g., server 310) at step 1514. In some embodiments, the point-of-sale device (e.g., merchant point-of-sale device 201) may access payment card update data (e.g., interactivity data) without passing URL 315 and access a server 304 (with access to database 305), via a communication network 309, to retrieve the payment card update data. It will be understood that server 304 may be a part of a cloud computing environment, with merchant point-of-sale device 201 as a cloud client, that searches informational databases (e.g., database 305) for interactivity data via control circuitry 311, I/O path 312, and/or storage 314. At step 1516, a payment card update (e.g., graphical image update, animation, notification sound, etc.) occurs (in accordance with the received payment card update data from the point-of-sale device), via I/O path 202 including control circuitry 204, and the transaction is completed at step 1518.

Figure 16:
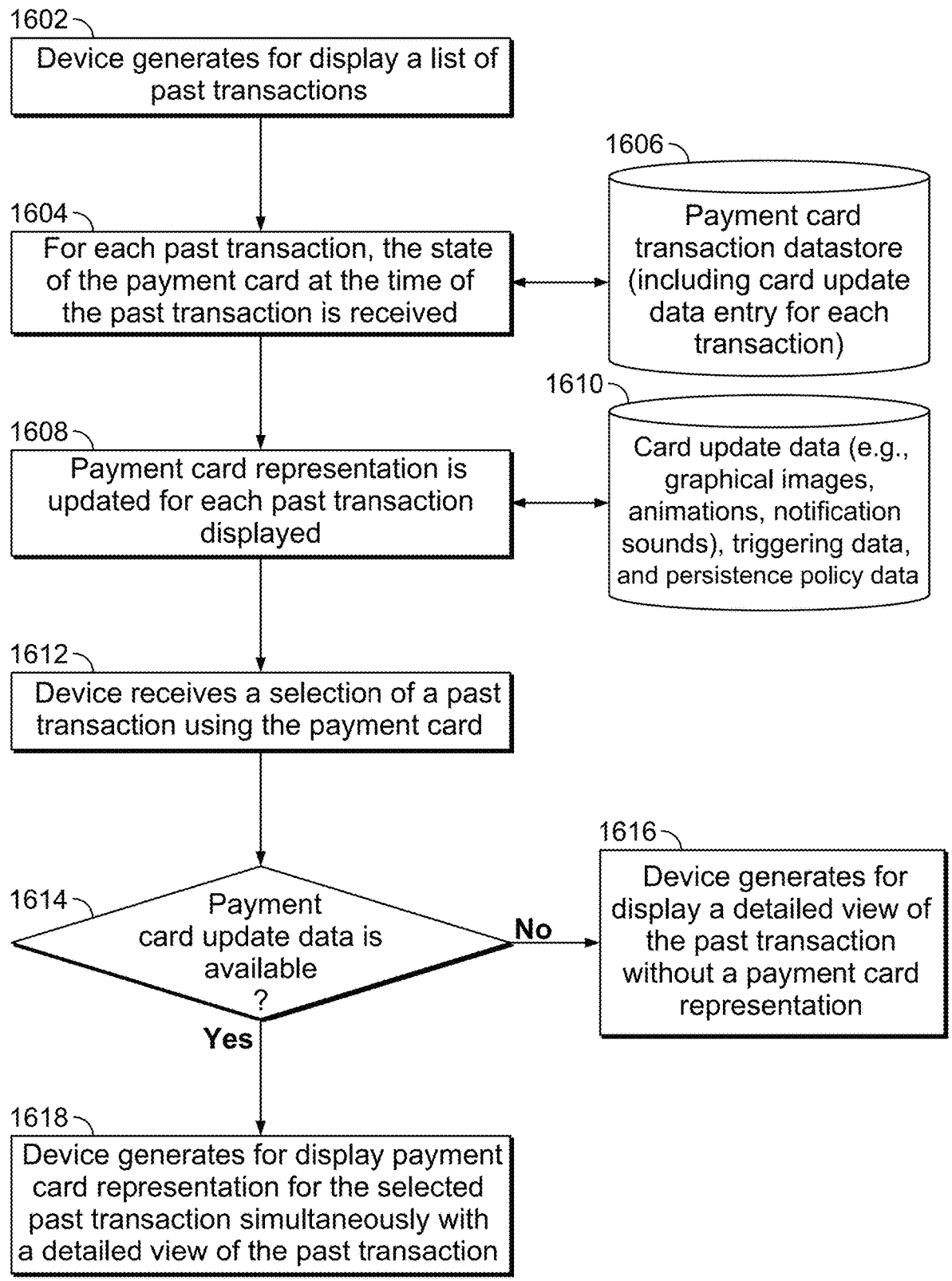
FIG. 16 is a flowchart of a detailed illustrative process for playing a virtual payment card representation from a past transaction, in accordance with some embodiments of the present disclosure.

FIG. 16 is a flowchart of a detailed illustrative process for playing a virtual payment card representation from a past transaction, in accordance with some embodiments of the present disclosure. At step 1602, a device (e.g., user device 402/user equipment 200) generates a list of past transactions (e.g., latest transactions 704 provided by FIG. 7A) in a graphical user interface (GUI). Control circuitry (e.g., control circuitry 204) proceeds to step 1604, where for each past transaction the state of the payment card (e.g., the representation of the card image for the payment card) at the time of the past transaction is received from a payment card transaction datastore (e.g., server 304 via communication network 309). At step 1608, control circuitry (e.g., I/O path 202 including control circuitry 204) updates payment card representation for each past transaction displayed in accordance with card update data (e.g., graphical images, animations, notification sounds), triggering data, and persistence policy data received from a database (e.g., database 305) at step 1610. At step 1612, the device (e.g., user device 402/user equipment 200) receives a selection, via user input interface 210, of a past transaction using the virtual payment card, and control circuitry determines whether payment card update data is available at step 1614. If payment card update data is not available, control circuitry proceeds to step 1616 where the device (e.g., user device 402/user equipment 200) generates for display, via display 212 and I/O path 202 (including control circuitry 204), a detailed view of the past transaction without a payment card representation. If payment card update data is available, control circuitry proceeds to step 1618 where the device (e.g., user device 402/user equipment 200) generates for display, via display 212 and I/O path 202 (including control circuitry 204), a payment card representation (e.g., representation 126 provided by step 120 of FIG. 1—an animation of Mickey Mouse dancing) for the selected past transaction simultaneously with a detailed view of the past transaction (e.g., including the balance of the transaction, the status of the transaction, merchant information, the date and/or time of the transaction, etc.). In some embodiments, the representation for the past transaction may include a graphic image (e.g., representation 606 provided by FIG. 6B—a Louis Vuitton brand logo design), based on card image data received via I/O path 202 (including control circuitry 204), as the card image for the virtual payment card.

Figure 17:
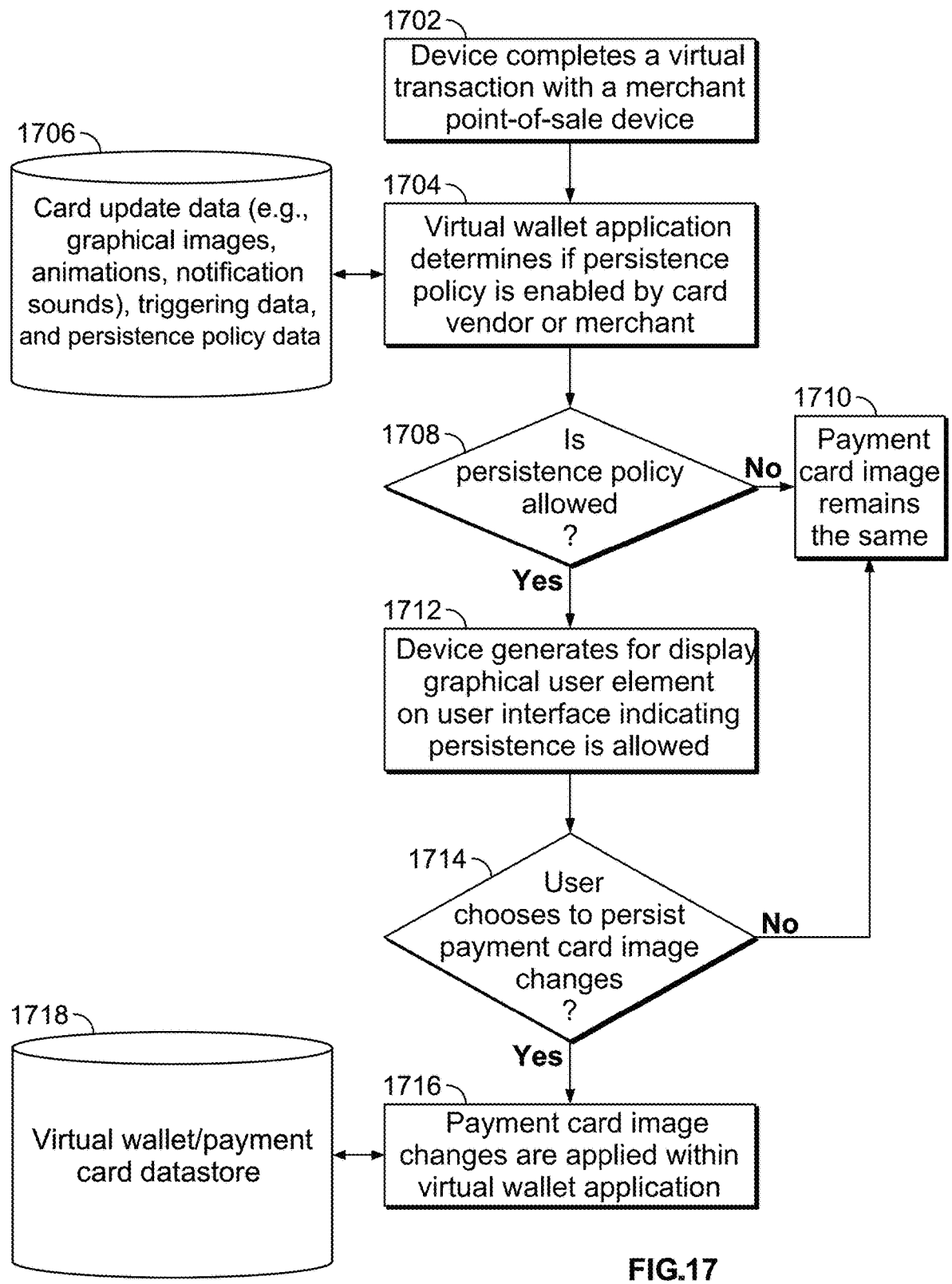
FIG. 17 is a flowchart of a detailed illustrative process for persisting a graphic image as the card image of a virtual payment card, in accordance with some embodiments of the present disclosure.

FIG. 17 is a flowchart of a detailed illustrative process for persisting a graphic image as the card image of a virtual payment card, in accordance with some embodiments of the present disclosure. At step 1702, a device (e.g., user device 402/user equipment 200) completes a virtual transaction with a merchant point-of-sale device (e.g., merchant point-of-sale device 201 via communication network 309). Control circuitry (e.g., control circuitry 204) then proceeds to step 1704, where a virtual wallet application determines if a persistence policy, based on persistence policy data, is enabled by the card vendor or merchant based on interactivity data (e.g., card update data, triggering data, persistence policy data, etc.) received from a database (e.g., database 305 via communication network 309) at step 1706. It will be understood that I/O path 202 (including control circuitry 204) of user device 402 receives the foregoing interactivity data for the virtual wallet application to perform the aforementioned determination at step 1704. At step 1708, control circuitry determines if a persistence policy is allowed. If no persistence policy is allowed, control circuitry proceeds to step 1710 where the payment card image remains the same. If a persistence policy is allowed, control circuitry proceeds to step 1712 where the device (e.g., user device 402/user equipment 200) generates for display, via display 212 and I/O path 202 (including control circuitry 204), a graphical user element (e.g., persistence element 802) on a user interface indicating persistence is allowed. If a user decides not to persist the payment card image change at step 1714, control circuitry proceeds to step 1710, and the payment card image remains the same. If a user decides to persist the payment card image change at step 1714, control circuitry proceeds to step 1716, and the payment card image changes (e.g., an animation or graphic image) are applied, via I/O path 202, within the virtual wallet application (e.g., virtual wallet application 806) and stored in a virtual wallet/payment card datastore (e.g., database 305), per step 1718. In some embodiments, the payment card image change may be maintained until the graphical user element (e.g., persistence element 802) is selected again. In some embodiments, the payment card image change may be maintained for a threshold period of time (e.g., a day, a week, a month, three months, etc.).

Figure 18:
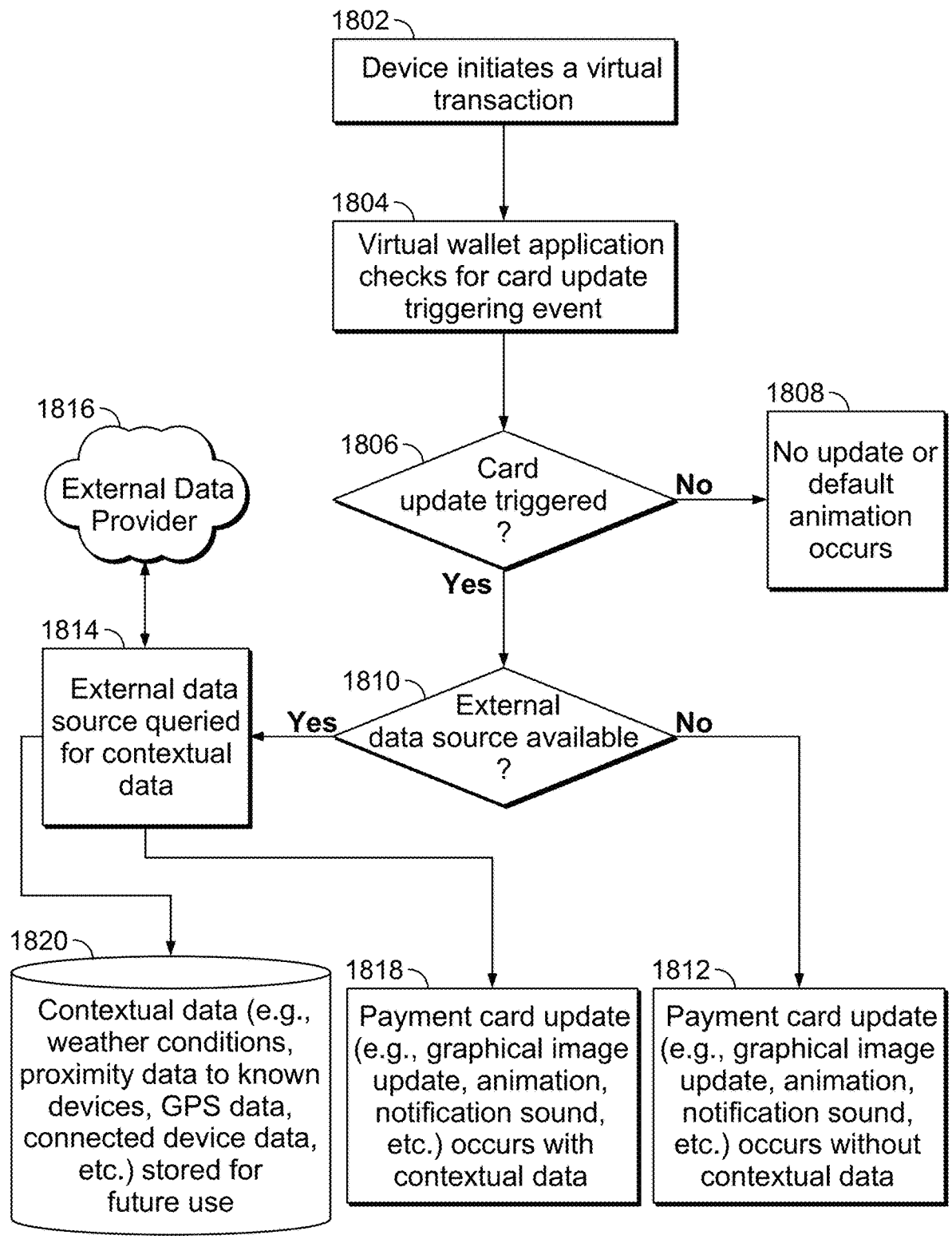
FIG. 18 is a flowchart of a detailed illustrative process for updating a representation of a virtual payment card based on contextual data, in accordance with some embodiments of the present disclosure.

FIG. 18 is a flowchart of a detailed illustrative process for updating a representation of a virtual payment card based on contextual data, in accordance with some embodiments of the present disclosure. At step 1802, a device (e.g., user device 402/user equipment 200) initiates a virtual transaction with a merchant point-of-sale device 201, and, at step 1804, a virtual wallet application checks for a card update triggering event (e.g., card update data—graphic images, animations, and notification sounds—triggering data, persistence policy data, etc.). Control circuitry (e.g., control circuitry 204) proceeds to step 1806 where, if no card update is triggered, no card update occurs or a default animation (e.g., a check mark) occurs, per step 1808. If a card update is triggered, control circuitry proceeds to step 1810 to determine if an external data source (e.g., server 304 with access to database 305) is available. If an external data source is not available, the payment card update (e.g., graphical image update, animation, notification sound, etc.) occurs, via I/O path 202 (including control circuitry 204), without contextual data, per step 1812. If an external data source is available, control circuitry proceeds to step 1814 where the external data source (e.g., external data provider 1816) is queried for contextual data (e.g., weather data, global positioning system (GPS) data, proximity data to a known device, connected device data, etc.). In some embodiments, external data provider 816 (e.g., server 304) may be a part of a cloud computing environment, with user device 402/user equipment 200 as a cloud client, that searches informational databases (e.g., database 305) for contextual data via control circuitry 311, I/O path 312, and/or storage 314. Accordingly, control circuitry (e.g., I/O path 202 including control circuitry 204) updates the payment card image based on the contextual data at step 1818 (e.g., representation 1002 provided by FIG. 10B—Mickey Mouse dancing with Minnie Mouse) and stores the contextual data at a database (e.g., server 304 with access to database 305) for future use, per step 1820.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating for display on display of a first device a first generic representation of a payment card associated with an account provided by a financial institution;
detecting, based at least in part on proximity of the first device with a second device, a first transaction using the payment card;
receiving, via a network, interactivity data from the second device, wherein the interactivity data is transmitted by the second device in response to the first transaction using the payment card;
temporarily modifying a second representation of the payment card with a first video animation according to the interactivity data,
displaying on the display of the first device, in association with the first transaction, the temporarily modified second representation of the payment card;
detecting an attempt to log into the account provided by a financial institution using the first device;
accessing a plurality of alternative video animations that were not generated for display during previous transactions using the payment card;
based on the attempt to log into the account, displaying on the display of the first device the first video animation that was displayed in association with the first transaction simultaneously with the plurality of alternative video animations that were not generated for display during previous transactions using the payment card to prompt a selection of one of the first video animation or one of the plurality of alternative video animations;
receiving the selection of one of the first video animation or one of the plurality of alternative video animations; and
based on the receiving the selection performing one of:
authenticating the attempt to log into the account in response to the selection being a selection of the second representation of the payment card to grant access to the first device to the account; or
terminating the attempt to log into the account in response to the selection being a selection of one of the plurality of alternative video animations to prevent access to the account by the first device.

2. The method of claim 1, further comprising preventing phishing attacks by:
generating for display an authentication page that requests an input of credentials; and
simultaneously generating for display the first video animation temporarily modified according to the interactivity data.

3. The method of claim 1, wherein the second device is a merchant point-of-sale device, and wherein the detecting, based at least in part on proximity of the first device with the second device, the first transaction using the payment card comprises detecting a payment at the merchant point-of-sale device using the payment card.

4. The method of claim 3, wherein:
the receiving, via the network, interactivity data from the second device comprises receiving animation data from the merchant point-of-sale device; and
the generating for display on the display of the first device, in association with the first transaction, the second representation of the payment card temporarily modified with the first video animation according to the interactivity data comprises changing a generic image of the first generic representation of the payment card with an animation using the received animation data.

5. The method of claim 4, wherein:
the receiving, via the network, interactivity data from the second device further comprises receiving notification sound data from the merchant point-of-sale device; and
further comprising playing an audio alert related to the animation using the received notification sound data simultaneously with the generating for display on the display of the first device, in association with the first transaction, the second representation of the payment card temporarily modified with the first video animation according to the interactivity data.

6. The method of claim 3, wherein:
the receiving, via the network, interactivity data from the second device comprises receiving card image data from the merchant point-of-sale device; and
the generating for display on the display of the first device, in association with the first transaction, the second representation of the payment card temporarily modified with the first video animation according to the interactivity data comprises changing a first image of the first generic representation of the payment card with a second image using the received card image data.

7. The method of claim 6, further comprising persisting the second image using the received card image data in place of the first image of the first generic representation of the payment card for future transactions.

8. The method of claim 1, further comprising:
generating for display a user interface comprising a list of past transactions that used the payment card;
receiving a selection of a particular past transaction from the list of past transactions; and
generating for display a representation of the payment card modified according to interactivity data that was provided during the particular past transaction.

9. The method of claim 8, wherein the received interactivity data comprises notification sound data from a merchant point-of-sale device, and further comprising:
playing an audio alert related to the representation of the payment card using the notification sound data simultaneously with the representation of the payment card modified according to the interactivity data that was provided during the particular past transaction.

10. The method of claim 1, further comprising:
displaying transaction goals for the payment card, wherein each of the transaction goals includes criteria to access a representation of the payment card; and
in response to the first transaction using the payment card satisfying the criteria, granting access to the representation of the payment card.

11. The method of claim 1, further comprising generating for display the second representation of the payment card based on contextual data received from the first device, wherein the contextual data comprises weather data, global positioning system (GPS) data, proximity data to a known device, or connected device data.

12. A system comprising:
at least one control circuitry configured to:
generate for display on display on a first device a first generic representation of a payment card associated with an account provided by a financial institution;
detect, based at least in part on proximity of the first device with a second device, a first transaction using the payment card;
receive, via a network, interactivity data from the second device, wherein the interactivity data is transmitted by the second device in response to the first transaction using the payment card;
temporarily modify a second representation of the payment card with a first video animation according to the interactivity data;
display on the display of the first device, in association with the first transaction, the temporarily modified second representation of the payment card;
detect an attempt to log into the account provided by a financial institution using the first device;
access a plurality of alternative video animations that were not generated for display during previous transactions using the payment card;
based on the attempt to log into the account, displaying on the display of the first device: the first video animation that was displayed in association with the first transaction simultaneously with the plurality of alternative video animations that were not generated for display during previous transactions using the payment card to prompt a selection of one of the first video animation or one of the plurality of alternative video animations;
receive the selection of one of the first video animation or one of the plurality of alternative video animations; and
in response to the selection being a selection of the second representation of the payment card, authenticate the attempt to log into the account to grant access to the first device to the account; or
in response to the selection being a selection of one of the plurality of alternative video animations, transmit signal to terminate the attempt to log into the account to prevent access to the account by the first device.

13. The system of claim 12, further comprising control circuitry configured to:
generate for display an authentication page that requests an input of credentials; and
simultaneously generate for display the first video animation temporarily modified according to the interactivity data.

14. The system of claim 12, wherein the second device is a merchant point-of-sale device, and wherein detecting, based at least in part on proximity of the first device with the second device, the first transaction using the payment card comprises detecting a payment at the merchant point-of-sale device using the payment card.

15. The system of claim 14, wherein:
receiving, via the network, interactivity data from the second device comprises receiving animation data from the merchant point-of-sale device; and
generating for display on the display of the first device, in association with the first transaction, the second representation of the payment card temporarily modified with the first video animation according to the interactivity data comprises changing a generic image of the first generic representation of the payment card with an animation using the received animation data.

16. The system of claim 15, wherein:
the receiving, via the network, interactivity data from the second device further comprises receiving notification sound data from the merchant point-of-sale device; and
further comprising control circuitry configured to:
play an audio alert related to the animation using the received notification sound data simultaneously with the generating for display on the display of the first device, in association with the first transaction, the second representation of the payment card temporarily modified with the first video animation according to the interactivity data.

17. The system of claim 14, wherein:
receiving, via the network, interactivity data from the second device comprises receiving card image data from the merchant point-of-sale device; and
generating for display on the display of the first device, in association with the first transaction, the second representation of the payment card temporarily modified with the first video animation according to the interactivity data comprises changing a first image of the first generic representation of the payment card with a second image using the received card image data.

18. A system comprising:
means for generating for display on display of a first device a first generic representation of a payment card associated with an account provided by a financial institution;
means for detecting, based at least in part on proximity of the first device with a second device, a first transaction using the payment card;
means for receiving, via a network, interactivity data from the second device, wherein the interactivity data is transmitted by the second device in response to the first transaction using the payment card; and
means for temporarily modifying a second representation of the payment card with a first video animation according to the interactivity data
means for displaying on the display of the first device, in association with the first transaction, the temporarily modified second representation of the payment card;
means for detecting an attempt to log into the account provided by a financial institution using the first device;
means for accessing a plurality of alternative video animations that were not generated for display during previous transactions using the payment card;
means, for based on the attempt to log into the account, displaying on the display of the first device: the first video animation that was displayed in association with the first transaction simultaneously with the plurality of alternative video animations that were not generated for display during previous transactions using the payment card to prompt a selection of one of the first video animation or one of the plurality of alternative video animations;
means for receiving the selection of one of the first video animation or one of the plurality of alternative video animations; and
means for:
based on the receiving the selection performing one of:
authenticating the attempt to log into the account in response to the selection being a selection of the second representation of the payment card to grant access to the first device to the account; or
terminating the attempt to log into the account in response to the selection being a selection of one of the plurality of alternative video animations to prevent access to the account by the first device.

* * * * *